US012780146B2

(12) United States Patent
Noguchi et al.

(10) Patent No.: US 12,780,146 B2

(45) Date of Patent: Nov. 3, 2026

(54) CONTROL DEVICE, CONTROL METHOD, AND CONTROL PROGRAM

(71) Applicant: HONDA MOTOR CO., LTD., Tokyo (JP)

(72) Inventors: Junpei Noguchi, Tokyo (JP); Gaku Shimamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 18/848,933

(22) PCT Filed: Mar. 22, 2022

(86) PCT No.: PCT/JP2022/013184

§ 371 (c)(1),
(2) Date: Sep. 20, 2024

(87) PCT Pub. No.: WO2023/181122

PCT Pub. Date: Sep. 28, 2023

(65) Prior Publication Data

US 2025/0206260 A1 Jun. 26, 2025

(51) Int. Cl.

*B60R 25/24* (2013.01)
*B60R 25/01* (2013.01)
(Continued)

(52) U.S. Cl.

CPC .............. *B60R 25/24* (2013.01); *B60R 25/01* (2013.01); *E05F 15/40* (2015.01); *E05F 15/76* (2015.01); *E05Y 2900/531* (2013.01)

(58) Field of Classification Search

CPC ........... B60R 25/01; B60R 25/24; B62D 1/00; B62D 15/0285; E05F 15/40; E05F 15/76; E05Y 2900/531; G08G 1/168

See application file for complete search history.

(56) References Cited

U.S. PATENT DOCUMENTS 11,548,517 B2 * 1/2023 Golsch .................. H04W 76/10
12,139,100 B2 * 11/2024 DeLong .................. B60R 25/04
(Continued)

FOREIGN PATENT DOCUMENTS

DE 102019124629 A1 * 3/2020 ......... B62D 15/0285
DE 102019205137 A1 * 10/2020 ............ B60W 30/06
(Continued)

OTHER PUBLICATIONS

Jun. 14, 2022, Translation of International Search Report issued for related PCT Application No. PCT/JP2022/013184.
(Continued)

*Primary Examiner* — Babar Sarwar

(74) *Attorney, Agent, or Firm* — Paratus Law Group, PLLC

(57) ABSTRACT

A control device for a moving object that includes a plurality of opening and closing bodies includes: a control unit configured to perform movement control of the moving object based on a specific operation on an information terminal portable by a user of the moving object. In response to an opening and closing reservation of a specific opening and closing body other than an opening and closing body of a driver seat of the moving object among the plurality of opening and closing bodies being received during execution of the movement control, the control unit sets a target movement position of the movement control based on a positional relationship between the specific opening and closing body and the information terminal.

10 Claims, 21 Drawing Sheets

(51) Int. Cl.

| | |
|---|---|
| ***E05F 15/40*** | (2015.01) |
| ***E05F 15/76*** | (2015.01) |

(56) References Cited

U.S. PATENT DOCUMENTS

| | | | | |
|---|---|---|---|---|
| 12,248,086 | B2 * | 3/2025 | Nakashima | B60R 25/24 |
| 12,286,075 | B2 * | 4/2025 | Kobayashi | B60W 30/06 |
| 2002/0152010 | A1 * | 10/2002 | Colmenarez | B60R 25/2045 340/426.1 |
| 2007/0290796 | A1 * | 12/2007 | Teshima | E05B 81/78 340/5.72 |
| 2013/0275008 | A1 * | 10/2013 | Breed | E05F 15/73 701/49 |
| 2014/0032031 | A1 * | 1/2014 | Okamura | B62D 6/00 701/23 |
| 2014/0222252 | A1 * | 8/2014 | Matters | B62D 15/027 701/2 |
| 2015/0254913 | A1 * | 9/2015 | Obata | G07C 9/30 340/5.72 |
| 2015/0261304 | A1 * | 9/2015 | Kamisawa | G07C 9/00174 340/5.28 |
| 2016/0101745 | A1 * | 4/2016 | Siswick | H04W 4/40 701/2 |
| 2017/0032599 | A1 * | 2/2017 | Elie | G07C 9/32 |
| 2017/0101110 | A1 * | 4/2017 | Yoo | B60W 10/20 |
| 2017/0344001 | A1 * | 11/2017 | Mukai | B60K 35/10 |
| 2018/0099643 | A1 * | 4/2018 | Golsch | B60R 25/24 |
| 2018/0236972 | A1 * | 8/2018 | Linden | B60R 25/01 |
| 2018/0268209 | A1 * | 9/2018 | Sato | B60K 35/10 |
| 2018/0363354 | A1 * | 12/2018 | Linden | E05B 81/70 |
| 2019/0051069 | A1 * | 2/2019 | Cooley | G06F 21/32 |
| 2019/0152433 | A1 * | 5/2019 | Cumbo | G07C 9/00714 |
| 2019/0176760 | A1 * | 6/2019 | Uenoyama | B60R 25/305 |
| 2019/0193725 | A1 | 6/2019 | Suzuki et al. | |
| 2019/0202445 | A1 * | 7/2019 | Lavoie | B60W 30/06 |
| 2019/0302754 | A1 * | 10/2019 | Tsuruoka | B62D 15/0285 |
| 2019/0308612 | A1 * | 10/2019 | Lavoie | B60R 25/245 |
| 2020/0086830 | A1 * | 3/2020 | Ichinose | B60R 25/246 |
| 2020/0103487 | A1 * | 4/2020 | Tzirkel-Hancock | G01S 5/0027 |
| 2020/0209011 | A1 * | 7/2020 | Iwasaki | G01C 21/3407 |
| 2020/0238952 | A1 * | 7/2020 | Lindsay | G06V 30/194 |
| 2020/0262388 | A1 * | 8/2020 | Maddelein | B60R 25/01 |
| 2020/0307626 | A1 * | 10/2020 | Noguchi | B60W 50/082 |
| 2020/0310430 | A1 * | 10/2020 | Shoda | B62D 15/0285 |
| 2020/0324816 | A1 * | 10/2020 | Edling | B62D 15/0285 |
| 2021/0214989 | A1 * | 7/2021 | Linden | B60J 5/06 |
| 2021/0293074 | A1 * | 9/2021 | Morosawa | E05F 15/73 |
| 2021/0370867 | A1 * | 12/2021 | Morosawa | B60R 25/01 |
| 2022/0017044 | A1 * | 1/2022 | Bielby | B60R 25/25 |
| 2022/0057475 | A1 * | 2/2022 | Nakashima | B60R 25/24 |
| 2022/0170310 | A1 * | 6/2022 | Katahara | E05F 15/43 |
| 2022/0205309 | A1 * | 6/2022 | Castonguay | B60R 25/24 |
| 2022/0316257 | A1 * | 10/2022 | Kang | B60R 25/245 |
| 2023/0016676 | A1 * | 1/2023 | Salter | B60Q 9/006 |
| 2023/0066207 | A1 * | 3/2023 | Herrera Gutierrez | B60J 5/06 |
| 2023/0077123 | A1 * | 3/2023 | Salter | E05B 81/20 |
| 2023/0174018 | A1 * | 6/2023 | Van Wiemeersch | B60R 25/24 |
| 2023/0294636 | A1 * | 9/2023 | Anko | E05F 15/77 340/5.72 |

FOREIGN PATENT DOCUMENTS

| | | | | | |
|---|---|---|---|---|---|
| EP | 3918169 | B1 * | 8/2025 | | E05F 15/75 |
| JP | 2020-163906 | A | 10/2020 | | |
| JP | 2020-164091 | A | 10/2020 | | |
| JP | 7661805 | B2 * | 4/2025 | | B60R 25/305 |
| WO | WO 2018/047222 | A1 | 3/2018 | | |
| WO | WO-2018116383 | A1 * | 6/2018 | | B60R 25/209 |
| WO | WO-2020165652 | A1 * | 8/2020 | | E05B 81/78 |
| WO | WO-2022114095 | A1 * | 6/2022 | | B60R 16/02 |

OTHER PUBLICATIONS

Jun. 14, 2022, Translation of International Search Opinion issued for related PCT Application No. PCT/JP2022/013184.

Nov. 4, 2025, Translation of Japanese Office Action issued for related JP Application No. 2024-508850.

* cited by examiner

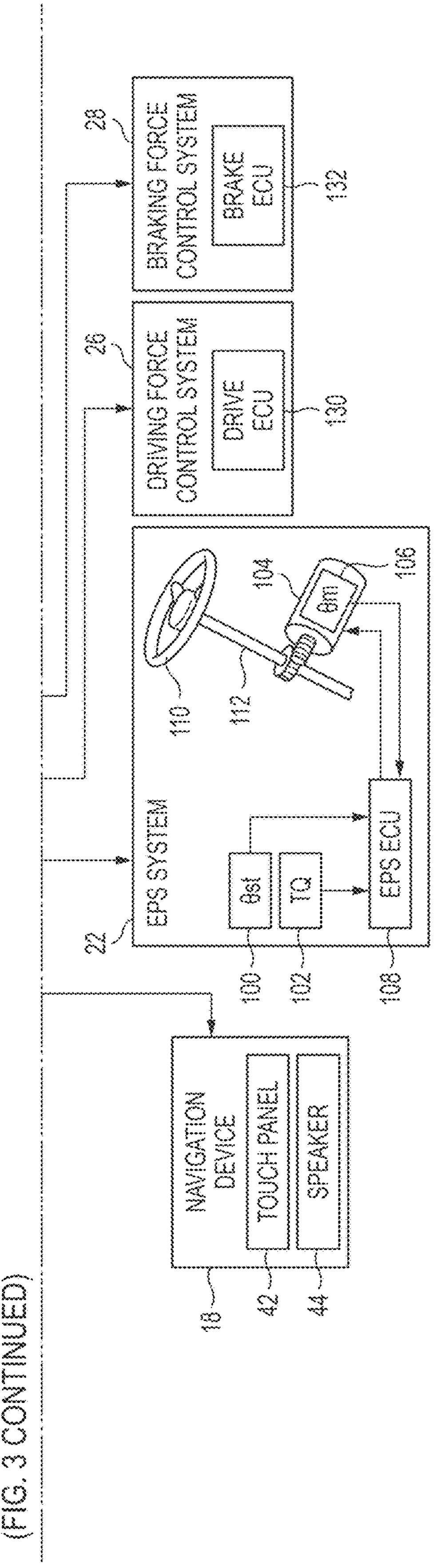
(FIG. 3 CONTINUED)

(CONT.)

(FIG. 18 CONTINUED)
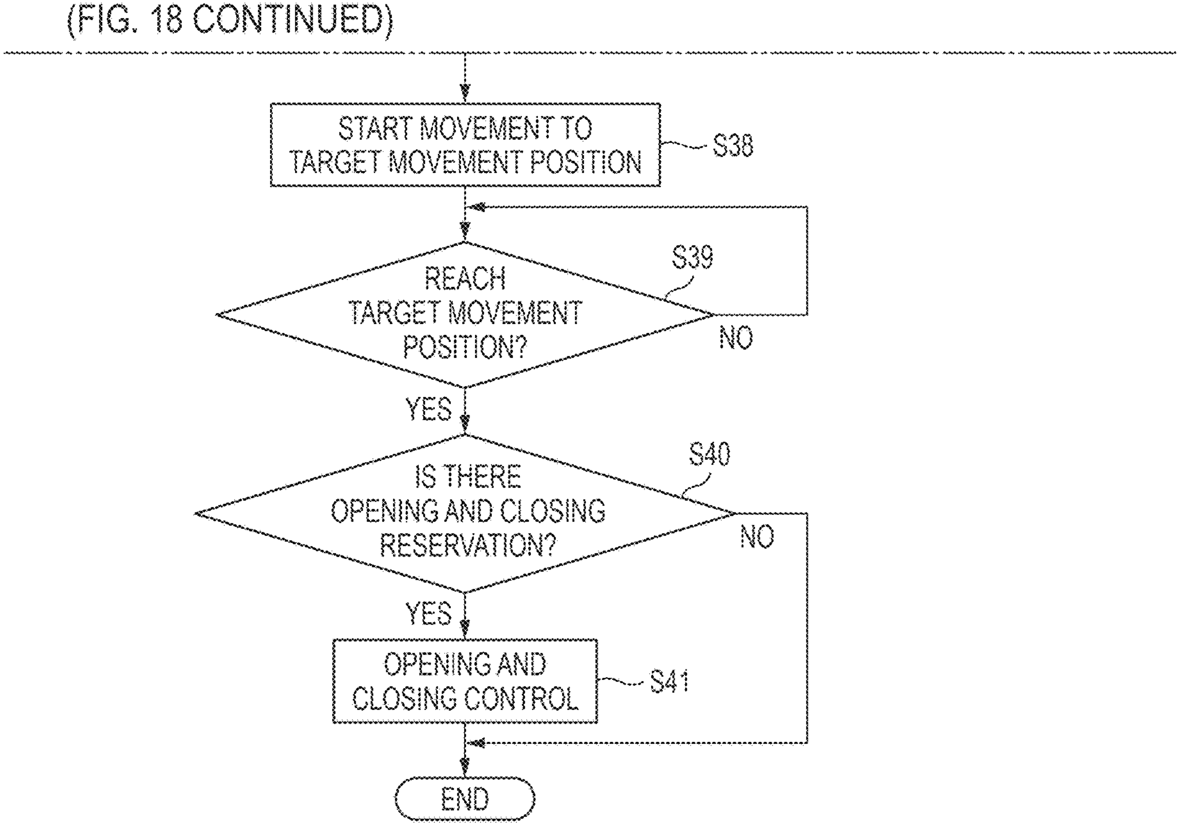

CONTROL DEVICE, CONTROL METHOD, AND CONTROL PROGRAM

CROSS REFERENCE TO PRIOR APPLICATION

This application is a National Stage Patent Application of PCT International Patent Application No. PCT/JP2022/013184 (filed on Mar. 22, 2022) under 35 U.S.C. § 371, which is hereby incorporated by reference in its entirety.

TECHNICAL FIELD

The present invention relates to a control device, a control method, and a control program.

BACKGROUND ART

In recent years, efforts have been made to provide access to a sustainable transportation system in consideration of people vulnerable among traffic participants. In order to implement the above, focus has been placed on research and development on further improving safety and convenience of traffic by research and development related to self-driving techniques.

In the related art, there is known a remote parking system that remotely operates a vehicle to park the vehicle in a specified predetermined parking space or to cause the vehicle to exit from the parking space. Patent Literature 1 discloses an exiting assistance device that can detect a position of an operator who specifies an exit position of a vehicle by an in-vehicle sensor or the like, set the exit position in the vicinity of the detected operator, and cause the vehicle to perform automated exiting to the exit position in the vicinity of the operator by a remote operation.

CITATION LIST

Patent Literature

Patent Literature 1: WO2018/047222

SUMMARY OF INVENTION

Technical Problem

According to the exiting assistance device in Patent Literature 1, it is possible to cause the vehicle to perform automated exiting to the exit position in the vicinity of the operator. However, for example, when a vehicle door other than a vehicle door of a driver seat is to be opened and closed, an operator specifies the door to be opened and closed, the vehicle is caused to perform automated exiting such that the specified door is easily accessible, and thus a burden of a setting operation by the operator is heavy.

An object of the present invention is to provide a control device, a control method, and a control program that may reduce a burden on a user when the user accesses an opening and closing body other than a driver seat at the time of automated exiting of a moving object. This contributes to development of a sustainable transportation system.

Solution to Problem

The present invention provides a control device for a moving object that includes a plurality of opening and closing bodies, the control device including:

a control unit configured to perform movement control of the moving object based on a specific operation on an information terminal portable by a user of the moving object, in which, in response to an opening and closing reservation of a specific opening and closing body other than an opening and closing body of a driver seat of the moving object among the plurality of opening and closing bodies being received during execution of the movement control, the control unit sets a target movement position of the movement control based on a positional relationship between the specific opening and closing body and the information terminal.

The present invention provides a control method for a moving object that includes a plurality of opening and closing bodies, the control method including:

causing a control unit configured to perform movement control of the moving object based on a specific operation on an information terminal portable by a user of the moving object set, in response to an opening and closing reservation of a specific opening and closing body other than an opening and closing body of a driver seat of the moving object among the plurality of opening and closing bodies being received during execution of the movement control, a target movement position of the movement control based on a positional relationship between the specific opening and closing body and the information terminal.

The present invention provides a control program for a moving object that includes a plurality of opening and closing bodies, in which the control program causes a processor configured to perform movement control of the moving object based on a specific operation on an information terminal portable by a user of the moving object to execute processing of setting, in response to an opening and closing reservation of a specific opening and closing body other than an opening and closing body of a driver seat of the moving object among the plurality of opening and closing bodies being received during execution of the movement control, a target movement position of the movement control based on a positional relationship between the specific opening and closing body and the information terminal.

Advantageous Effects of Invention

According to the present invention, it is possible to provide a control device, a control method, and a control program that may reduce a burden on a user when the user accesses an opening and closing body other than a driver seat at the time of automated exiting of a moving object.

DESCRIPTION OF EMBODIMENTS

Figure 1:
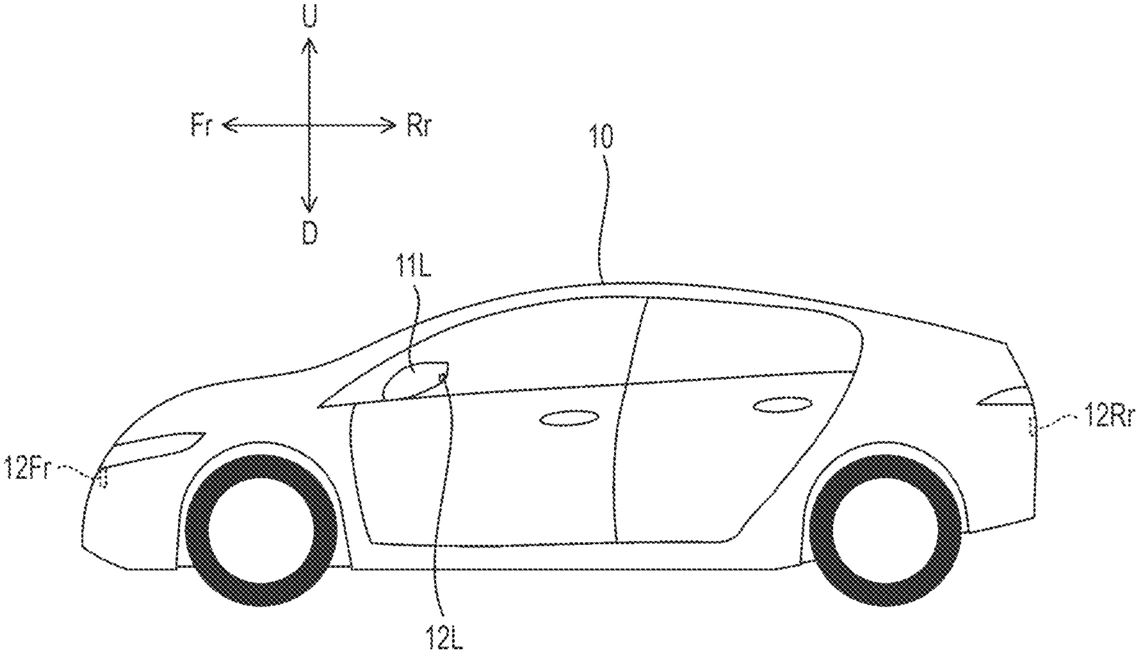
FIG. 1 is a side view showing an example of a vehicle subjected to movement control by a control device according to a present embodiment.

Hereinafter, an embodiment of a control device, a control method, and a control program of the present invention will be described with reference to the accompanying drawings. The drawings are viewed in directions of reference numerals. In order to simplify and clarify the description in the present specification or the like, a front-rear direction, a left-right direction, and an upper-lower direction are described according to directions viewed from a driver of a vehicle 10 shown in FIGS. 1 and 2. In the drawings, a front side of the vehicle 10 is shown as Fr, a rear side is shown as Rr, a left side is shown as L, a right side is shown as R, an upper side is shown as U, and a lower side is shown as D.

<Vehicle 10 Subjected to Movement Control by Control Device of Present Invention>

Figure 2:
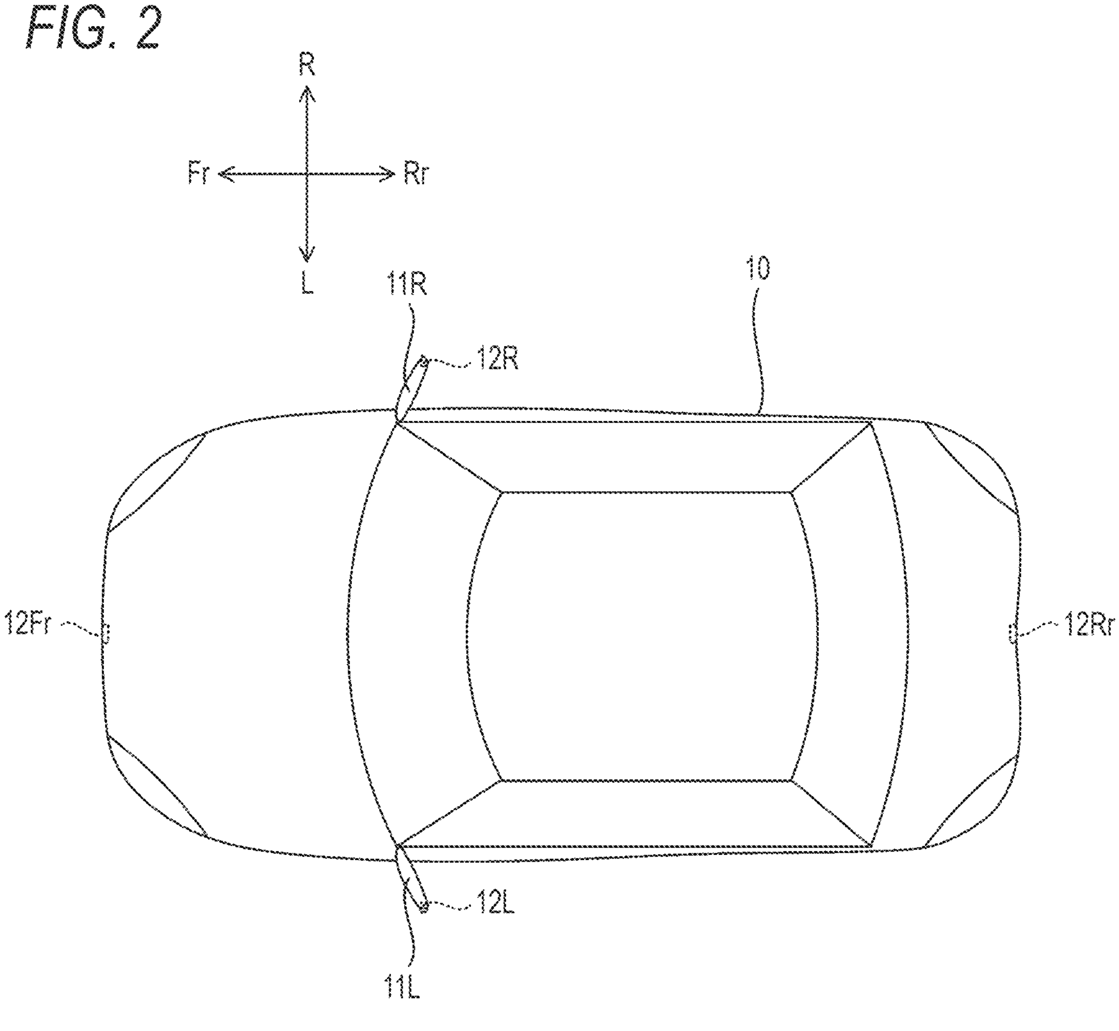
FIG. 2 is a top view of the vehicle shown in FIG. 1.

FIG. 1 is a side view of the vehicle 10 subjected to movement control by the control device of the present invention. FIG. 2 is a top view of the vehicle 10 shown in FIG. 1. The vehicle 10 is an example of a moving object of the present invention.

The vehicle 10 is an automobile including a drive source (not shown) and wheels including drive wheels driven by power of the drive source and steerable steered wheels. In the present embodiment, the vehicle 10 is a four-wheeled automobile having a pair of left and right front wheels and a pair of left and right rear wheels. The drive source of the vehicle 10 is, for example, an electric motor. The drive source of the vehicle 10 may be an internal combustion engine such as a gasoline engine or a diesel engine, or a combination of an electric motor and an internal combustion engine. The drive source of the vehicle 10 may drive the pair of left and right front wheels, the pair of left and right rear wheels, or four wheels including the pair of left and right front wheels and the pair of left and right rear wheels. The front wheels and the rear wheels may all be steerable steered wheels, or the front wheels or the rear wheels may be steerable steered wheels.

The vehicle 10 further includes side mirrors 11L and 11R. The side mirrors 11L and 11R are mirrors (back mirrors) provided on outer sides of front seat doors of the vehicle 10 for the driver to check the rear side and rear lateral sides. The side mirrors 11L and 11R are fixed to a body of the vehicle 10 by rotation shafts extending in a vertical direction, and may be opened and closed by rotating about the rotation shafts.

The vehicle 10 further includes a front camera 12Fr, a rear camera 12Rr, a left side camera 12L, and a right side camera 12R. The front camera 12Fr is a digital camera that is provided on the front side of the vehicle 10 and captures an image of the front side of the vehicle 10. The rear camera 12Rr is a digital camera that is provided on the rear side of the vehicle 10 and captures an image of the rear side of the vehicle 10. The left side camera 12L is a digital camera that is provided on the left side mirror 11L of the vehicle 10 and captures an image of the left side of the vehicle 10. The right side camera 12R is a digital camera that is provided on the right side mirror 11R of the vehicle 10 and captures an image of the right side of the vehicle 10.

<Internal Configuration of Vehicle 10>

Figure 3:
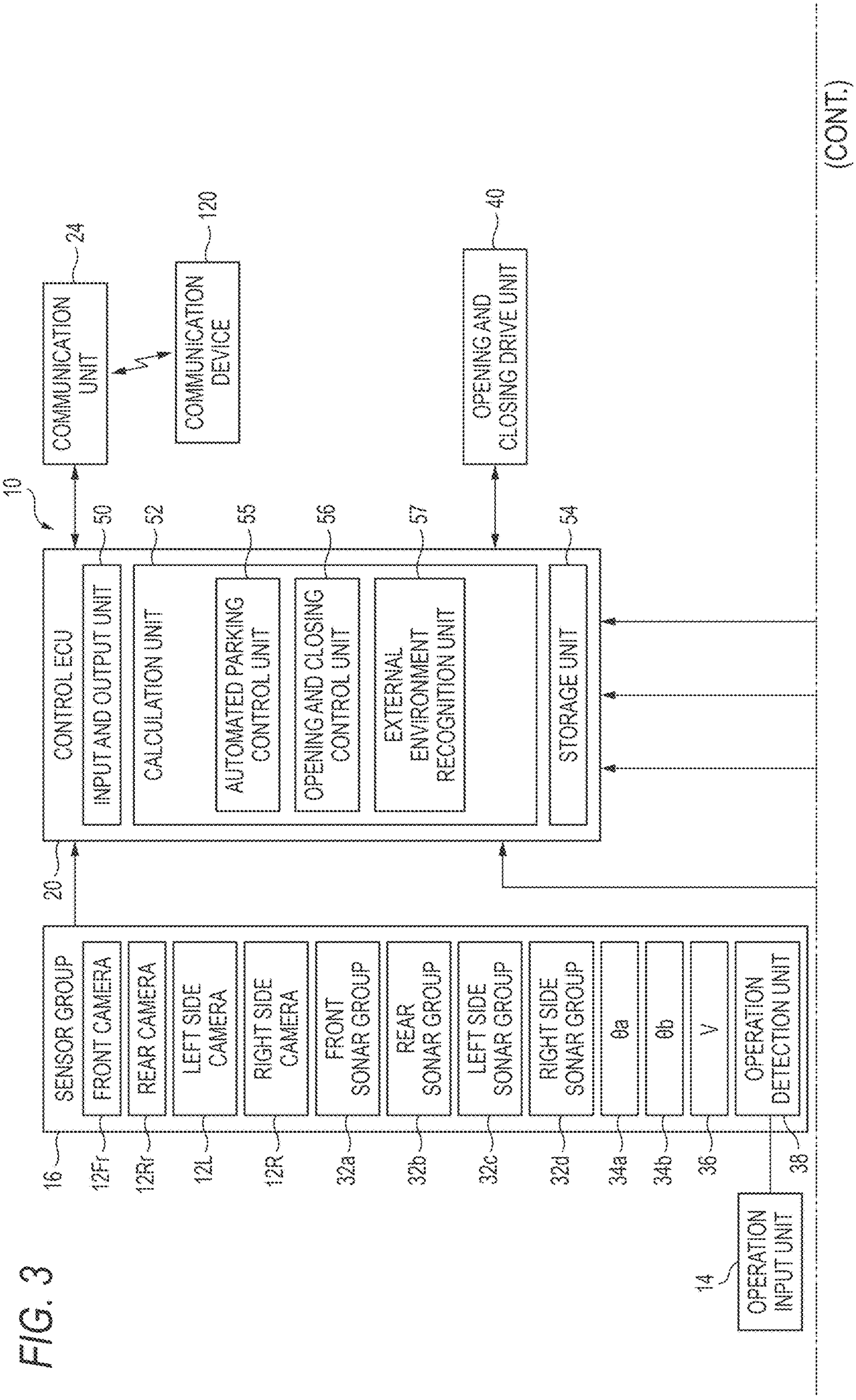
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control by the control ECU 20. The sensor group 16 includes the front camera 12Fr, the rear camera 12Rr, the left side camera 12L, and the right side camera 12R. The sensor group 16 also includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38. The sensor group 16 may include radar.

The front camera 12Fr, the rear camera 12Rr, the left side camera 12L, and the right side camera 12R acquire recognition data (for example, peripheral images) for recognizing an external environment of the vehicle 10 by capturing images of a periphery of the vehicle 10. The peripheral images captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image.

The front sonar group 32*a*, the rear sonar group 32*b*, the left side sonar group 32*c*, and the right side sonar group 32*d* emit sound waves to the periphery of the vehicle 10, and receive reflected sounds from other objects. The front sonar group 32*a* includes, for example, four sonars. The sonars that constitute the front sonar group 32*a* are respectively provided on an obliquely left front side, a front left side, a front right side, and an obliquely right front side of the vehicle 10. The rear sonar group 32*b* includes, for example, four sonars. The sonars that constitute the rear sonar group 32*b* are respectively provided on an obliquely left rear side, a rear left side, a rear right side, and an obliquely right rear side of the vehicle 10. The left side sonar group 32*c* includes, for example, two sonars. The sonars that constitute the left side sonar group 32*c* are provided at a left side front portion and a left side rear portion of the vehicle 10, respectively. The right side sonar group 32*d* includes, for example, two sonars. The sonars that constitute the right side sonar group 32*d* are provided at a right side front portion and a right side rear portion of the vehicle 10, respectively. The front sonar group 32*a*, the rear sonar group 32*b*, the left side sonar group 32*c*, and the right side sonar group 32*d* acquire detection data (for example, obstacle information) for detecting an obstacle around the vehicle 10. The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses each time the wheels rotate by a predetermined angle. The detection pulses output from the wheel sensors 34*a* and 34*b* are used to calculate rotation angles and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects an operation content of a user performed using an operation input unit 14, and outputs the detected operation content to the control ECU 20. The operation input unit 14 includes various user interfaces such as a side mirror switch that switches between opened and closed states of the side mirrors 11L and 11R, and a shift lever (a selector lever or a selector).

The navigation device 18 detects a current position of the vehicle 10 using, for example, a global positioning system (GPS), and guides the user along a route to a destination. The navigation device 18 includes a storage device (not shown) including a map information database.

The navigation device 18 includes a touch panel 42 and a speaker 44. The touch panel 42 functions as an input device and a display device of the control ECU 20. The speaker 44 outputs various types of guidance information to the user of the vehicle 10 by voice. The touch panel 42 is configured such that input of various commands to the control ECU 20 can be input via the touch panel 42. For example, the user may input a command related to movement assistance of the vehicle 10 via the touch panel 42. The movement assistance includes parking assistance and exiting assistance of the vehicle 10. The touch panel 42 displays various screens related to control contents of the control ECU 20. For example, the touch panel 42 displays a screen related to the movement assistance of the vehicle 10. Specifically, the touch panel 42 displays a parking assistance button for requesting parking assistance of the vehicle 10 and an exiting assistance button for requesting exiting assistance. The parking assistance button includes an automated parking button for requesting parking by automatic steering of the control ECU 20, and a support parking button for requesting support while parking the vehicle by an operation of the driver. The exiting assistance button includes an automated exiting button for requesting exiting by the automatic steering of the control ECU 20, and a support exiting button for requesting support while exiting by an operation of the driver. Components other than the touch panel 42, for example, a smartphone or a tablet terminal may also be used as the input device or the display device.

The control ECU 20 includes an input and output unit 50, a calculation unit 52, and a storage unit 54. The calculation unit 52 is implemented by, for example, a central processing unit (CPU). The calculation unit 52 executes various types of control by controlling units based on a program stored in the storage unit 54. Further, the calculation unit 52 receives and outputs signals from and to units connected to the control ECU 20 via the input and output unit 50. The calculation unit 52 is an example of a control device in the present invention.

The calculation unit 52 includes an automated parking control unit 55 that performs movement execution control of the vehicle 10, an opening and closing control unit 56 that performs opening and closing control of an opening and closing body of the vehicle 10, and an external environment recognition unit 57 that recognizes external environment information of the vehicle 10. The automated parking control unit 55 is an example of a control unit in the present invention.

The automated parking control unit 55 performs automated parking assistance and automated exiting assistance of the vehicle 10 by automatic steering in which a steering 110 is automatically operated under control of the automated parking control unit 55. In the automated parking assistance and the automated exiting assistance, an accelerator pedal (not shown), a brake pedal (not shown), and the operation input unit 14 are automatically operated. The automated parking control unit 55 performs auxiliary parking assistance and auxiliary exiting assistance when the driver operates the accelerator pedal, the brake pedal, and the operation input unit 14 to perform manual parking and manual exiting of the vehicle 10.

For example, based on the recognition data of the external environment of the vehicle 10 acquired by the front camera 12Fr, the rear camera 12Rr, the left side camera 12L, and the right side camera 12R, and a parking space specified by the user, the automated parking control unit 55 performs parking execution control for causing the vehicle 10 to perform automated 30 parking in the predetermined parking space and exiting execution control for causing the vehicle 10 to perform automated exiting from the predetermined parking space to a target movement position. The automated parking control unit 55 executes the parking execution control and the exiting execution control according to an instruction signal input from the outside via the input and output unit 50. The input from the outside includes input by wireless communication from an information terminal or the like carried by the user of the vehicle 10. The information terminal will be described later. The automated parking control unit 55 transmits information about the parking execution control and the exiting execution control to the external information terminal via the input and output unit 50.

Specifically, in a case where an opening and closing reservation of the opening and closing body of the vehicle 10 may be received in the exiting execution control of the vehicle 10, when the opening and closing reservation is received, the automated parking control unit 55 sets the target movement position of the vehicle 10 based on a positional relationship between the opening and closing body for which the opening and closing reservation is received and the information terminal carried by the user of the vehicle 10. The opening and closing reservation of the opening and closing body refers to a reservation of the opening and closing body that the user intends to preferentially open and close when the exiting of the vehicle 10 is completed. The target movement position is a target position to which the vehicle 10 is moved, and is a position at which the user easily accesses the opening and closing body for which the opening and closing reservation is received. Examples of the opening and closing body of the vehicle 10 include an opening and closing body of a driver seat, an opening and closing body of a front passenger seat, an opening and closing body of a rear seat, and a tail gate (rear gate). For example, the opening and closing body of the driver seat is an opening and closing body through which the driver gets on and off normally, and is an opening and closing body closest to the driver seat. The information terminal carried by the user is a terminal carried by the user who stands by at a position away from the exiting of the vehicle 10.

For example, when the opening and closing reservation of a specific opening and closing body other than the opening and closing body of the driver seat is received during the exiting execution control of the vehicle 10, the automated parking control unit 55 sets the target movement position of the vehicle 10 based on a positional relationship between the specific opening and closing body and the information terminal. The target movement position in this case is a position at which the user easily accesses the specific opening and closing body. The specific opening and closing body is an opening and closing body other than the opening and closing body of the driver seat, and is an opening and closing body of a front passenger seat, an opening and closing body of a rear seat, a tail gate (rear gate), or the like.

When the opening and closing reservation of the specific opening and closing body is not received during the exiting execution control of the vehicle 10, the automated parking control unit 55 sets the target movement position of the vehicle 10 based on a positional relationship between the opening and closing body of the driver seat and the information terminal. The target movement position in this case is a position at which the user easily accesses the driver seat. The opening and closing body that is a target of the positional relationship with the information terminal when the opening and closing reservation of the specific opening and closing body is not received is not limited to the opening and closing body of the driver seat, and may be set as desired by the user. For example, for a user who often uses a child seat, an opening and closing body of a seat to which the child seat is attached may be set as the target opening and closing body when no opening and closing reservation is received.

The automated parking control unit 55 determines a state of the user of the vehicle 10, and based on the determination result, the automated parking control unit 55 automatically performs determination without waiting for reception of the opening and closing reservation of the specific opening and closing body from the user. The state of the user is, for example, an amount of luggage carried by the user, presence or absence of a passenger, or presence or absence of child seat attachment. When the amount of luggage is large, the opening and closing reservation is set for the opening and closing body of the rear seat or the tail gate. When there is one passenger, the opening and closing reservation is set for the opening and closing body of the passenger seat. When the child seat is attached, the opening and closing reservation is set for the opening and closing body of a seat to which the child seat is attached. The automated parking control unit 55 determines the state of the user based on an image captured by the camera. The state of the user may include checkout information of the user, the number of smartphones registered for the vehicle 10, and the like. Purchased packages may be determined based on the checkout information, and the predetermined specific opening and closing body may be set. The number of passengers may be determined based on a communication result with registered smartphones, and the predetermined specific opening and closing body may be set. The automated parking control unit 55 may also determine and set the opening and closing body to be opened and closed by the automated parking control unit 55, and allow the user to determine by displaying a reception and approval button for determining whether the set opening and closing body is acceptable.

When the vehicle 10 exits to the target movement position, the automated parking control unit 55 determines availability of opening and closing of the opening and closing body of the vehicle 10 at the target movement position. The automated parking control unit 55 determines the availability of opening and closing of the opening and closing body based on a recognition result of the external environment by the external environment recognition unit 57. The automated parking control unit 55 determines the availability of opening and closing of the opening and closing body according to a distance between the opening and closing body of the vehicle 10 and a surrounding object around the vehicle and a type of the opening and closing body (a tail gate, a slide door, a hinge door, or the like). The automated parking control unit 55 sets the target movement position of the vehicle 10 based on the determination result of the availability of opening and closing of the opening and closing body.

The automated parking control unit 55 performs opening and closing of the predetermined opening and closing body when the vehicle 10 arrives at the set target movement position. The opening and closing of the opening and closing body include, for example, processing of enabling manual opening and closing of the opening and closing body (processing of unlocking the opening and closing body) and processing of automatically opening and closing the opening and closing body. The opening and closing of the opening and closing body may include, for example, processing of displaying guidance information about the opening and closing body on the information terminal.

The opening and closing control unit 56 performs opening and closing control for automatically opening and closing the opening and closing body such as a tail gate, a slide door, and a hinge door of the vehicle 10. The opening and closing control unit 56 performs, based on an opening and closing signal from the automated parking control unit 55, opening and closing control of the opening and closing body for which the opening and closing reservation is performed.

The external environment recognition unit 57 recognizes the external environment of the vehicle 10 based on the peripheral image of the vehicle 10 captured by the front camera 12Fr, the rear camera 12Rr, the left side camera 12L, and the right side camera 12R. The external environment recognition unit 57 may also recognize the external environment of the vehicle 10 based on information acquired by the sonar groups 32*a* to 32*d* or radar. Based on the external environment information acquired by the camera, the sonar, and the radar, the external environment recognition unit 57 recognizes presence of a surrounding object that may become an obstacle when opening and closing the opening and closing body of the vehicle 10.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby providing support for an occupant's operation on the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication with another communication device 120. The other communication device 120 is a base station, a communication device of another vehicle, or an information terminal such as a smartphone or a tablet terminal portable by the user of the vehicle 10. For example, the communication unit 24 includes an ultra wide band (UWB) interface for performing UWB communication with the information terminal.

The driving force control system 26 includes a drive ECU 130. The driving force control system 26 executes driving force control of the vehicle 10. The drive ECU 130 controls a driving force of the vehicle 10 by controlling an engine (not shown) or the like based on an operation by the user on an accelerator pedal (not shown).

The braking force control system 28 includes a brake ECU 132. The braking force control system 28 executes braking force control of the vehicle 10. The braking ECU 132 controls a braking force of the vehicle 10 by controlling a brake mechanism or the like (not shown) based on an operation by the user on a brake pedal (not shown).

<Hardware Configuration of Information Terminal>

Figure 4:
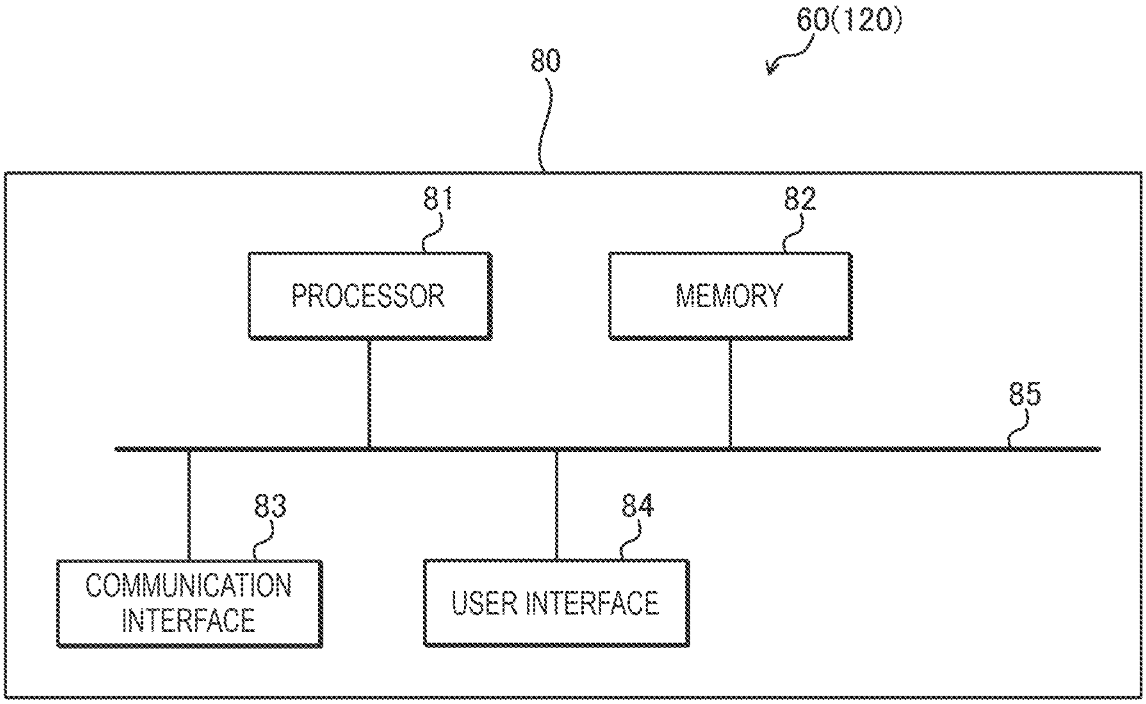
FIG. 4 shows an example of a hardware configuration of an information terminal.

FIG. 4 shows an example of a hardware configuration of an information terminal 60. Hardware of the information terminal 60 may be implemented by, for example, an information processing device 80 shown in FIG. 4. The information processing device 80 includes a processor 81, a memory 82, a communication interface 83, and a user interface 84. The processor 81, the memory 82, the communication interface 83, and the user interface 84 are connected by, for example, a bus 85.

The processor 81 is circuitry that performs signal processing, and is, for example, a central processing unit (CPU) that controls the entire information processing device 80. The processor 81 may be implemented by another digital circuit such as a field programmable gate array (FPGA) or a digital signal processor (DSP). The processor 81 may also be implemented by combining a plurality of digital circuits.

The memory 82 includes, for example, a main memory and an auxiliary memory. The main memory is, for example, a random access memory (RAM). The main memory is used as a work area of the processor 81.

The auxiliary memory is a non-volatile memory such as a magnetic disk, an optical disk, or a flash memory. The auxiliary memory stores various programs for operating the information processing device 80. The programs stored in the auxiliary memory are loaded into the main memory and executed by the processor 81.

The auxiliary memory may include a portable memory removable from the information processing device 80. Examples of the portable memory include a universal serial bus (USB) flash drive, a memory card such as a secure digital (SD) memory card, and an external hard disk drive.

The communication interface 83 is a communication interface that performs wireless communication with the outside of the information processing device 80 (for example, the communication unit 24 of the vehicle 10). For example, the communication interface 83 includes a UWB interface for performing UWB communication with the vehicle 10. The communication interface 83 is controlled by the processor 81.

The user interface 84 includes, for example, an input device that receives an operation input from the user and an output device that outputs information to the user. The input device may be implemented by, for example, a touch panel. The output device may be implemented by, for example, a display and a speaker. The user interface 84 is controlled by the processor 81.

The processor 81 performs movement instruction control for instructing movement of the vehicle 10. For example, the processor 81 performs the movement instruction control of the vehicle 10 based on a specific operation of the user on a terminal screen of the information terminal 60. The movement instruction control includes, for example, parking instruction control for causing the vehicle 10 to perform automated parking in a predetermined parking space and exiting instruction control for causing the vehicle 10 to perform automated exiting from the predetermined parking space to the target movement position. The specific operation of the user includes, for example, a swipe operation for moving the vehicle 10, and a tap operation for reserving parking and exiting plan items.

Specifically, in the exiting instruction control, the processor 81 receives an exiting plan of the vehicle 10 based on a reservation operation of the user on the terminal screen. The exiting plan is a plan related to the automated exiting of the vehicle 10, and includes, for example, a plan indicating in which direction the vehicle 10 is to exit when the vehicle 10 exits from the space in which the vehicle 10 is parked (an exiting direction of the vehicle 10), and a plan indicating whether to open and close a predetermined opening and closing body when exiting. The processor 81 may receive, for example, an opening and closing reservation for opening and closing the opening and closing body of the driver seat when exiting, and an opening and closing reservation for opening and closing a specific opening and closing body other than the opening and closing body of the driver seat. The processor 81 may receive the exiting plan when the automated exiting is started or in advance before the start.

Based on the specific operation on the terminal screen of the information terminal 60, the processor 81 transmits, to the vehicle 10, a parking instruction signal for causing the vehicle to perform automated parking and an exiting instruction signal for causing the vehicle 10 to perform automated exiting. An application software configured to perform movement control on the vehicle 10 by transmitting and receiving information about the movement control of the vehicle 10 to and from the vehicle 10 is installed in the information terminal 60.

<Example of Movement Instruction Control by Information Terminal 60>

Figure 5:
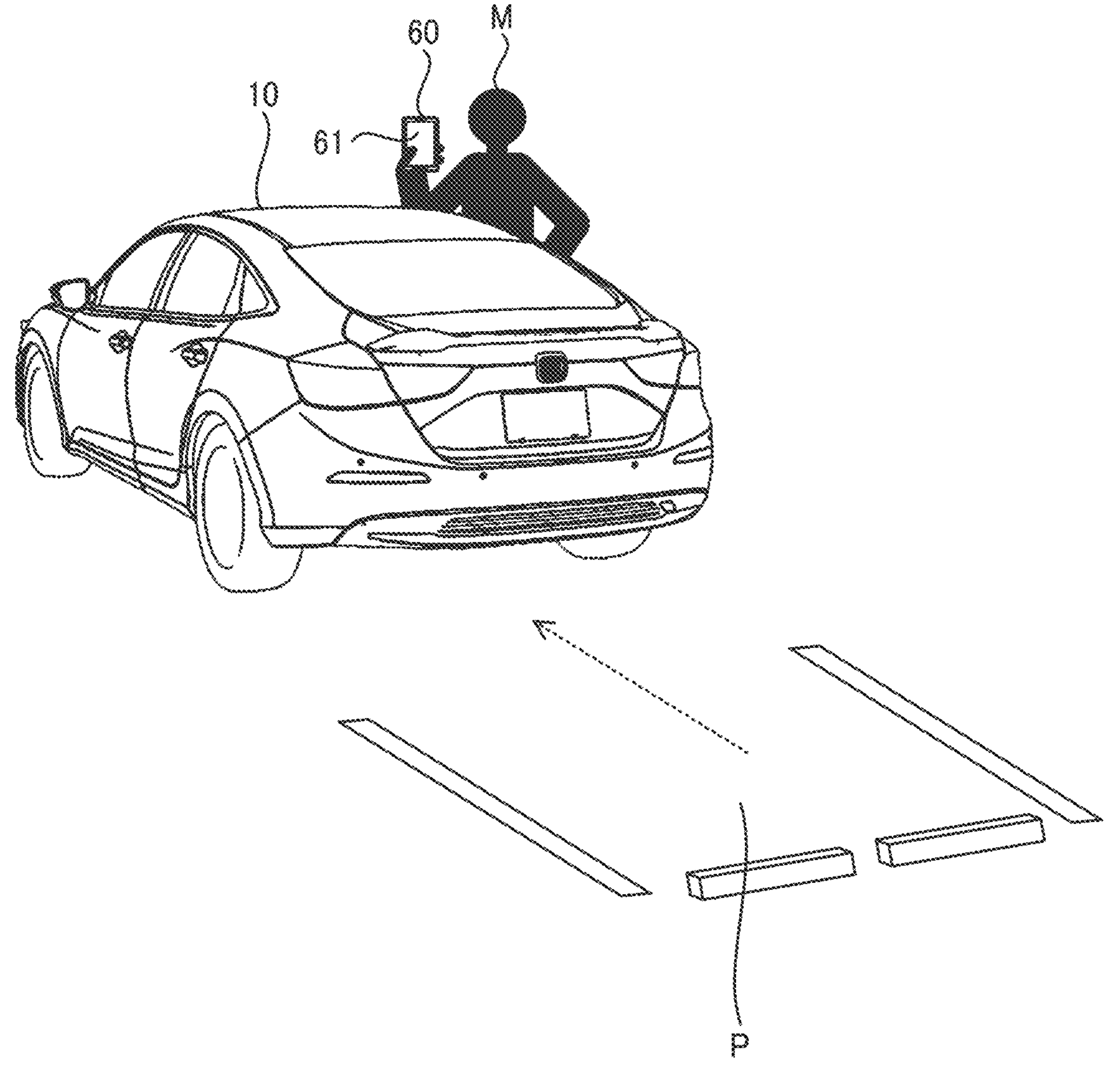
FIG. 5 shows a state in which the vehicle is subjected to exiting instruction control using an information terminal from the outside of the vehicle.

FIG. 5 shows an example of a state in which a user M of the vehicle 10 is located outside the vehicle 10 and performs the exiting instruction control for causing the vehicle 10 to perform automated exiting from a parking space P using the information terminal 60 carried by the user M.

When the user touches the terminal screen 61 implemented as a touch panel, the information terminal 60 transmits the exiting instruction signal for instructing automated exiting of the vehicle 10 to the vehicle 10 by wireless communication. The vehicle 10 receives the exiting instruction signal from the information terminal 60, and performs the exiting execution control for causing the vehicle 10 to perform automated exiting to the target movement position while performing wireless communication with the information terminal 60 according to the received exiting instruction signal. The state of the example shown in the drawing indicates a state in which the opening and closing reservation of a right front door of the vehicle 10 is received, and the vehicle 10 exits to a position where the user M easily accesses the right front door. For example, Ultra Wide Band (UWB: registered trademark), Bluetooth Low Energy (BLE: registered trademark), and Near Field Communication (NFC: registered trademark) are used as wireless communication between the information terminal 60 and the vehicle 10.

<Processing of Information Terminal 60 during Automated Exiting>

Next, an example of the exiting instruction control of the information terminal 60) during the automated exiting will be described with reference to FIGS. 6 to 17.

Figure 6:
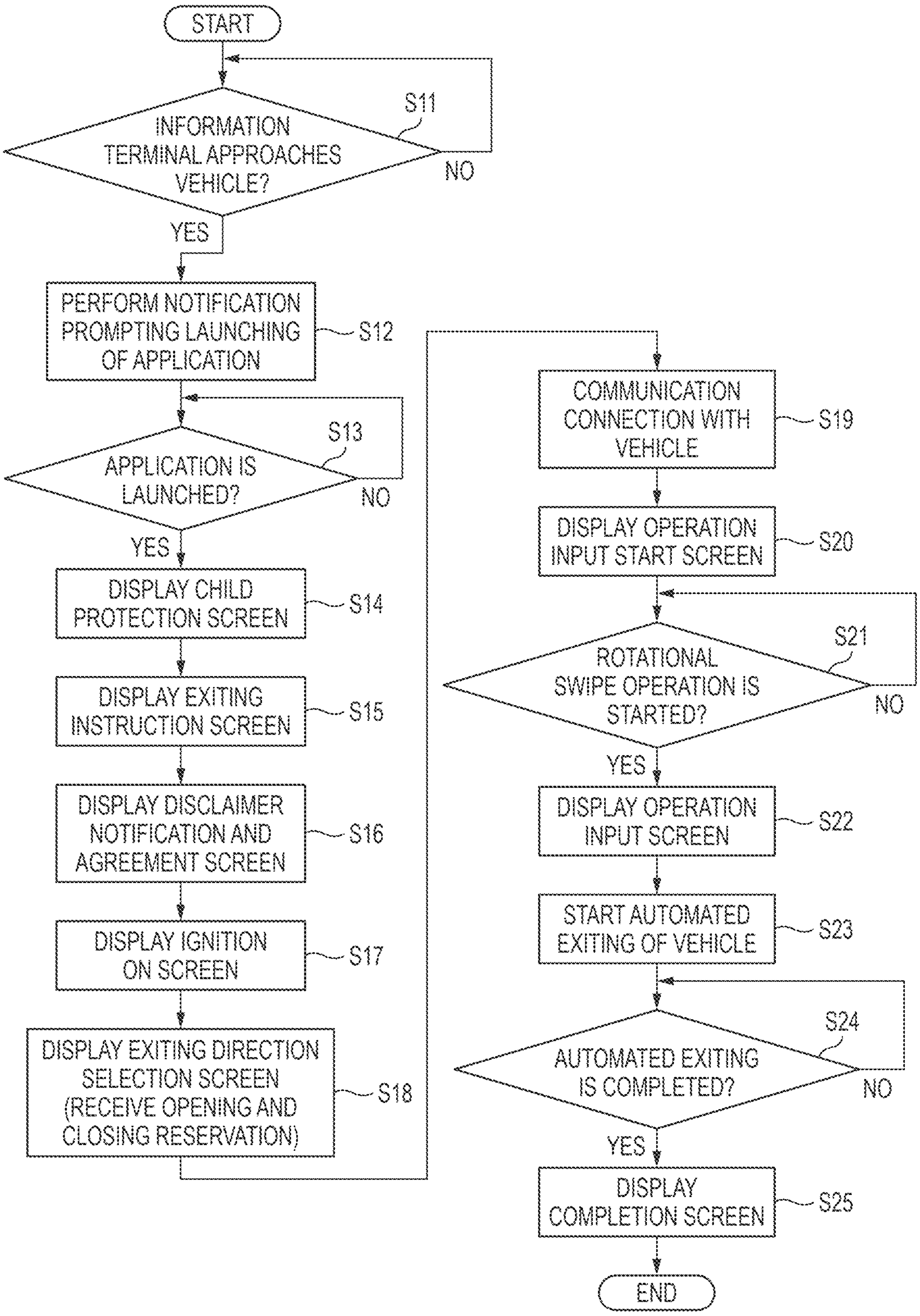
FIG. 6 is a flowchart showing the exiting instruction control during automated exiting by the information terminal.

FIG. 6 is a flowchart showing the exiting instruction control by the processor 81 of the information terminal 60 during automated exiting. FIGS. 7 to 17 show examples of images displayed on the information terminal 60 during automated exiting.

For example, the user M causes the vehicle 10 to exit from a parking lot. The user M carries the information terminal 60.

The processor 81 of the information terminal 60 determines whether the information terminal 60 approaches the vehicle 10, that is, whether the information terminal 60 approaches within a distance at which wireless communication with the vehicle 10 is available (step S11).

In step S11, when the information terminal 60 does not approach the vehicle 10 to a distance at which wireless communication is available (step S11: No), the processor 81 repeats the processing of step S11 until the wireless communication is available.

Figure 7:
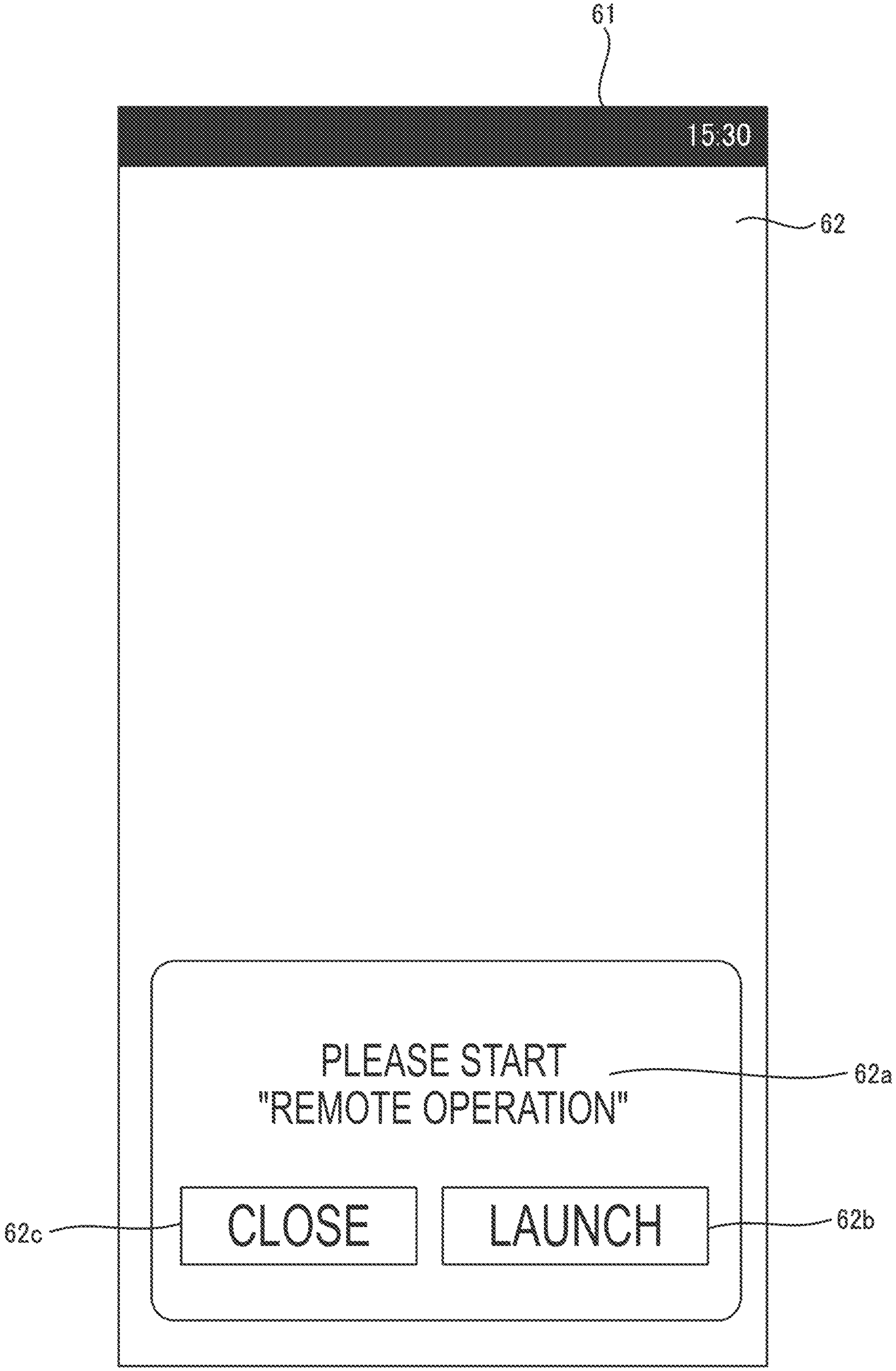
FIG. 7 shows an example of an automated exiting guidance screen displayed on the information terminal during automated exiting.

In step S11, when the information terminal 60 approaches the vehicle 10 to a distance at which the wireless communication is available (step S11: Yes), the processor 81 displays, on the terminal screen 61, for example, an automated exiting guidance screen 62 as shown in FIG. 7, and prompts launching of an automated exiting application of the vehicle 10 (step S12). The processor 81 displays, on the automated exiting guidance screen 62, for example, a notification message 62*a* for prompting the launching of the automated exiting application such as "please start the remote operation", a launch button 62*b* for launching the application, and a close button 62*c* for closing the automated exiting guidance screen 62.

Next, the processor 81 determines whether the automated exiting application is launched (step S13).

In step S13, when the automated exiting application is not launched (step S13: No), the processor 81 stands by until the application is launched. However, when the application is not launched for a certain period of time, the processor 81 may automatically close the automated exiting guidance screen 62.

Figure 8:
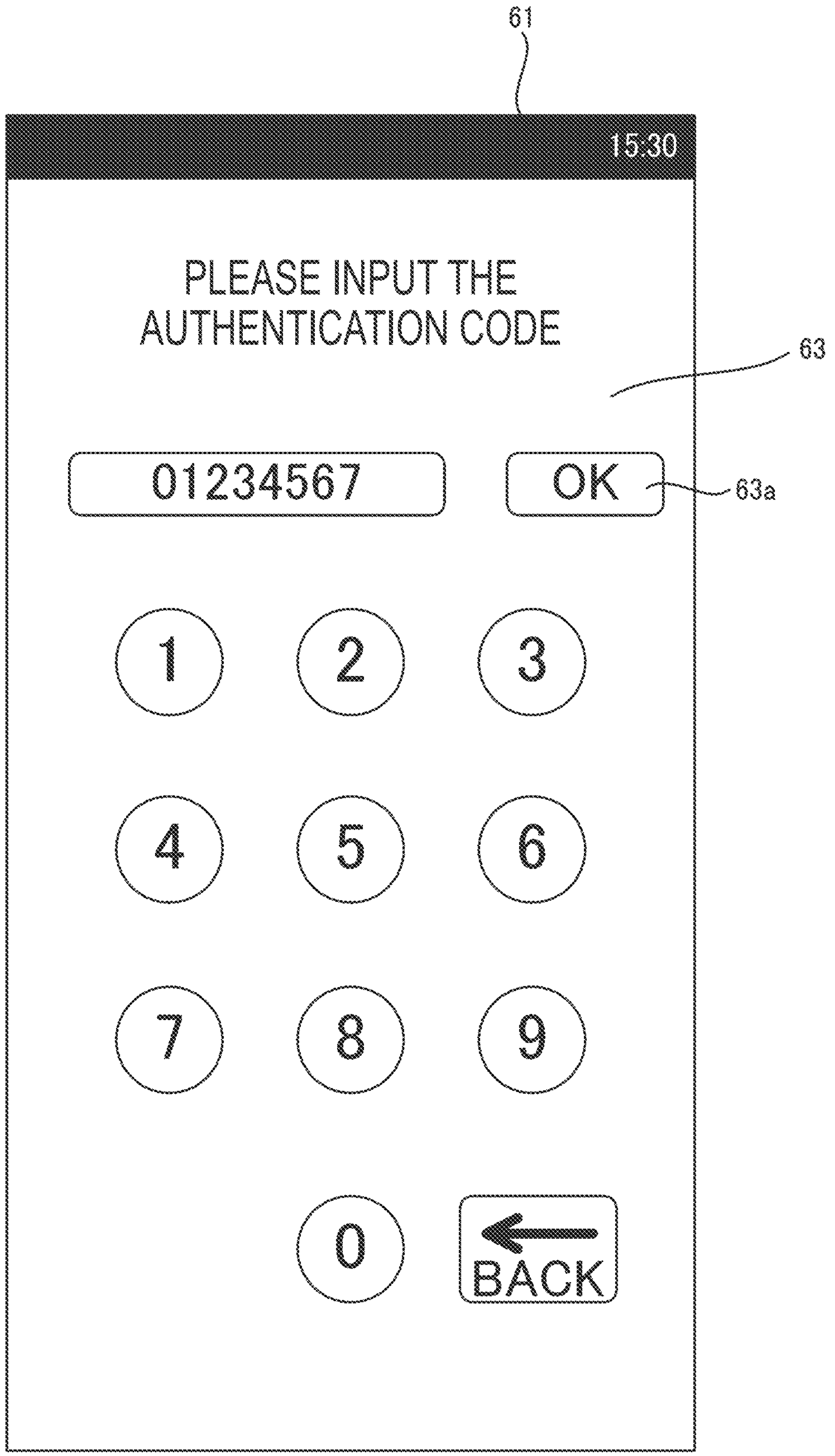
FIG. 8 shows an example of a child protection screen displayed on the information terminal during automated parking.

In step S13, when the automated exiting application is launched (step S13: Yes), the processor 81 displays, on the terminal screen 61, for example, a child protection screen 63 as shown in FIG. 8 (step S14).

Figure 9:
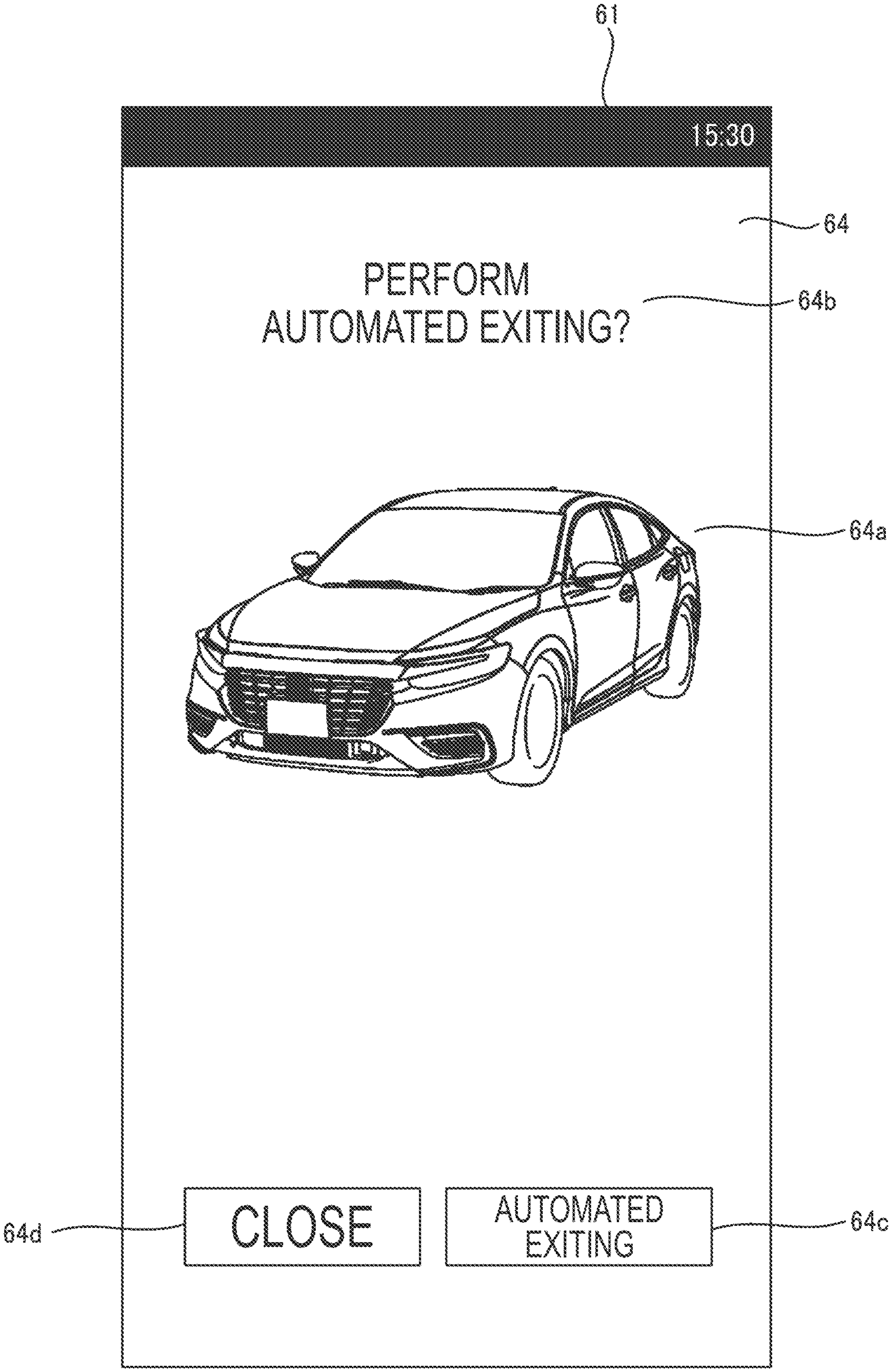
FIG. 9 shows an example of an exiting instruction screen displayed on the information terminal during automated exiting.

When an OK button 63*a* is touched after a predetermined authentication code is input in step S14, the processor 81 displays, on the terminal screen 61, for example, an exiting instruction screen 64 for confirming whether to perform automated exiting as shown in FIG. 9 (step S15). The processor 81 displays, for example, a vehicle image 64*a* of the vehicle 10 and a confirmation message 64*b* such as "perform automated exiting?" on the exiting instruction screen 64. The processor 81 also displays, on the exiting instruction screen 64, an automated exiting button 64*c* to be touched when performing automated exiting and a close button 64*d* for closing the exiting instruction screen 64 when automated exiting is not performed.

Figure 10:
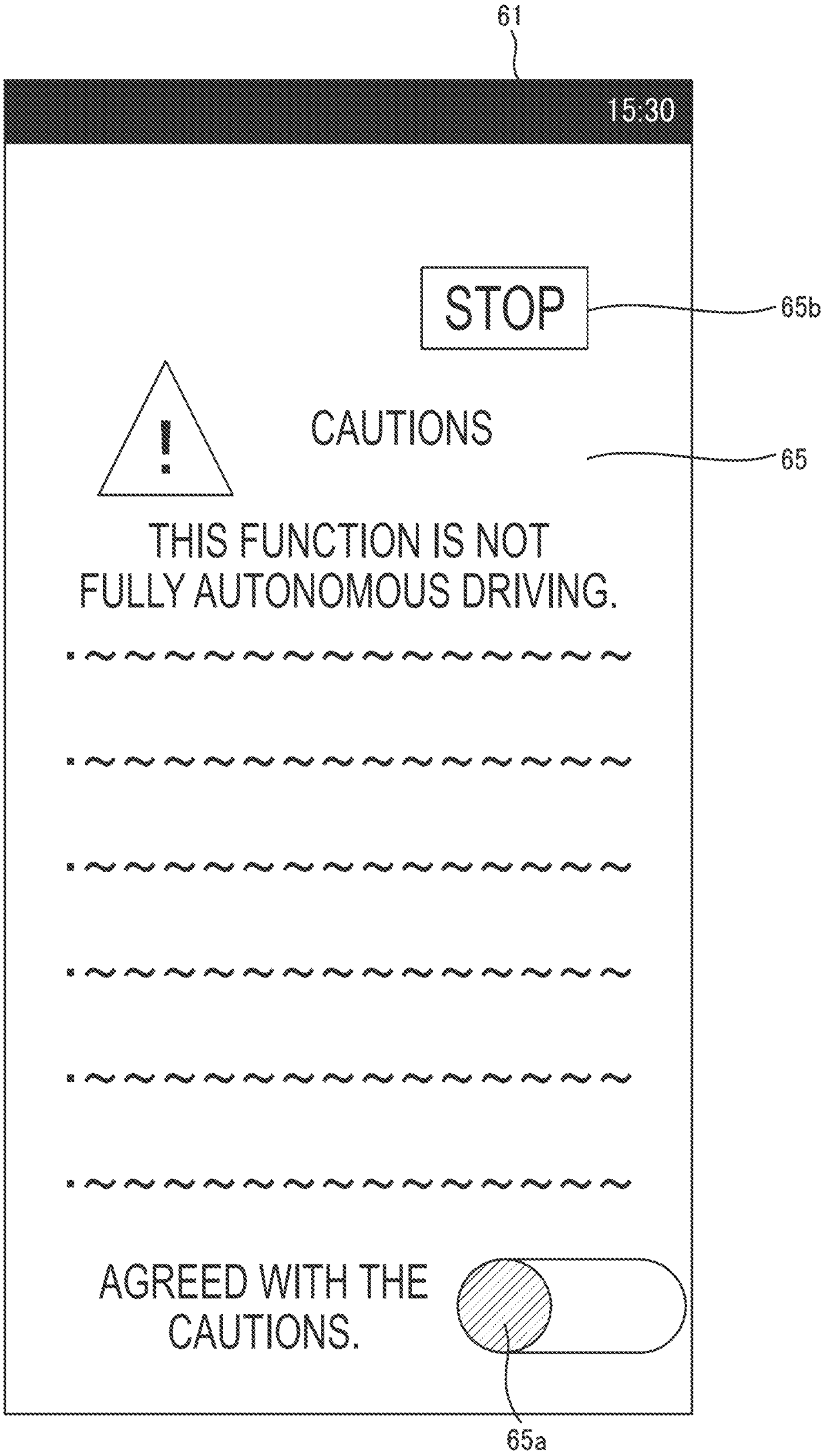
FIG. 10 shows an example of a disclaimer notification and agreement screen displayed on the information terminal during automated parking.

When the automated exiting button 64*c* is touched in step S15, for example, as shown in FIG. 10, the processor 81 displays, on the terminal screen 61, a disclaimer notification and agreement screen 65 stipulated for automated exiting (step S16). When contents of the disclaimer notification and agreement screen 65 are agreed with, a swipe operation is performed on an agreement button 65*a*, and when the contents are not agreed with, a stop button 65*b* for stopping the automated exiting is touched.

Figure 11:
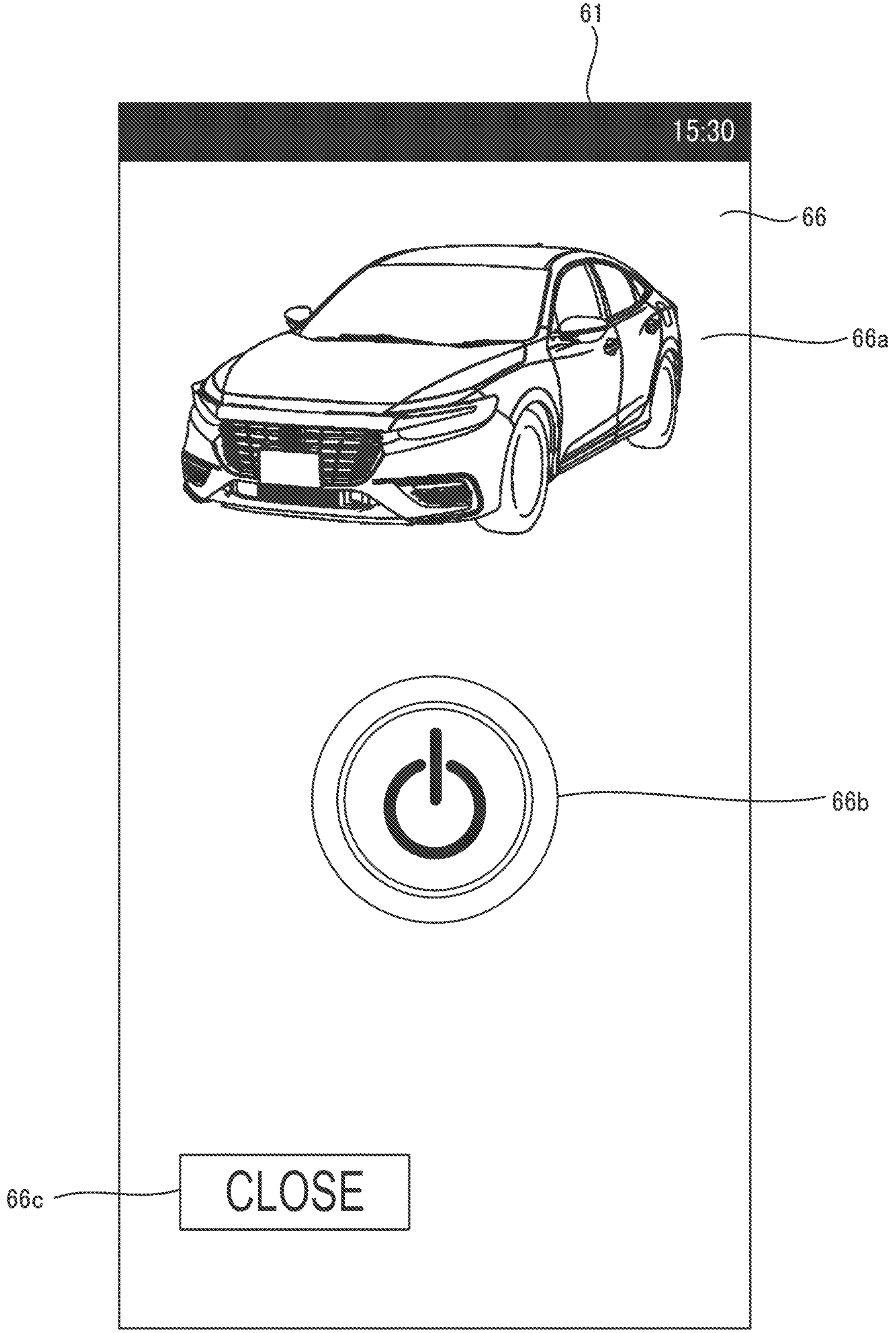
FIG. 11 shows an example of an ignition ON screen displayed on the information terminal during automated exiting.

When a swipe operation is performed on the agreement button 65*a* in step S16, the processor 81 displays, on the terminal screen 61, for example, an ignition ON screen 66 as shown in FIG. 11 to prompt selection of the exiting direction of the vehicle 10 at the time of exiting (step S17). The processor 81 displays, on the ignition ON screen 66, for example, a vehicle image 66*a* of the vehicle 10 and an ignition ON button 66*b* for advancing the automated exiting. The processor 81 also displays, on the ignition ON screen 66, a close button 66*c* for closing the ignition ON screen 66 when the automated exiting is stopped.

Figure 12:
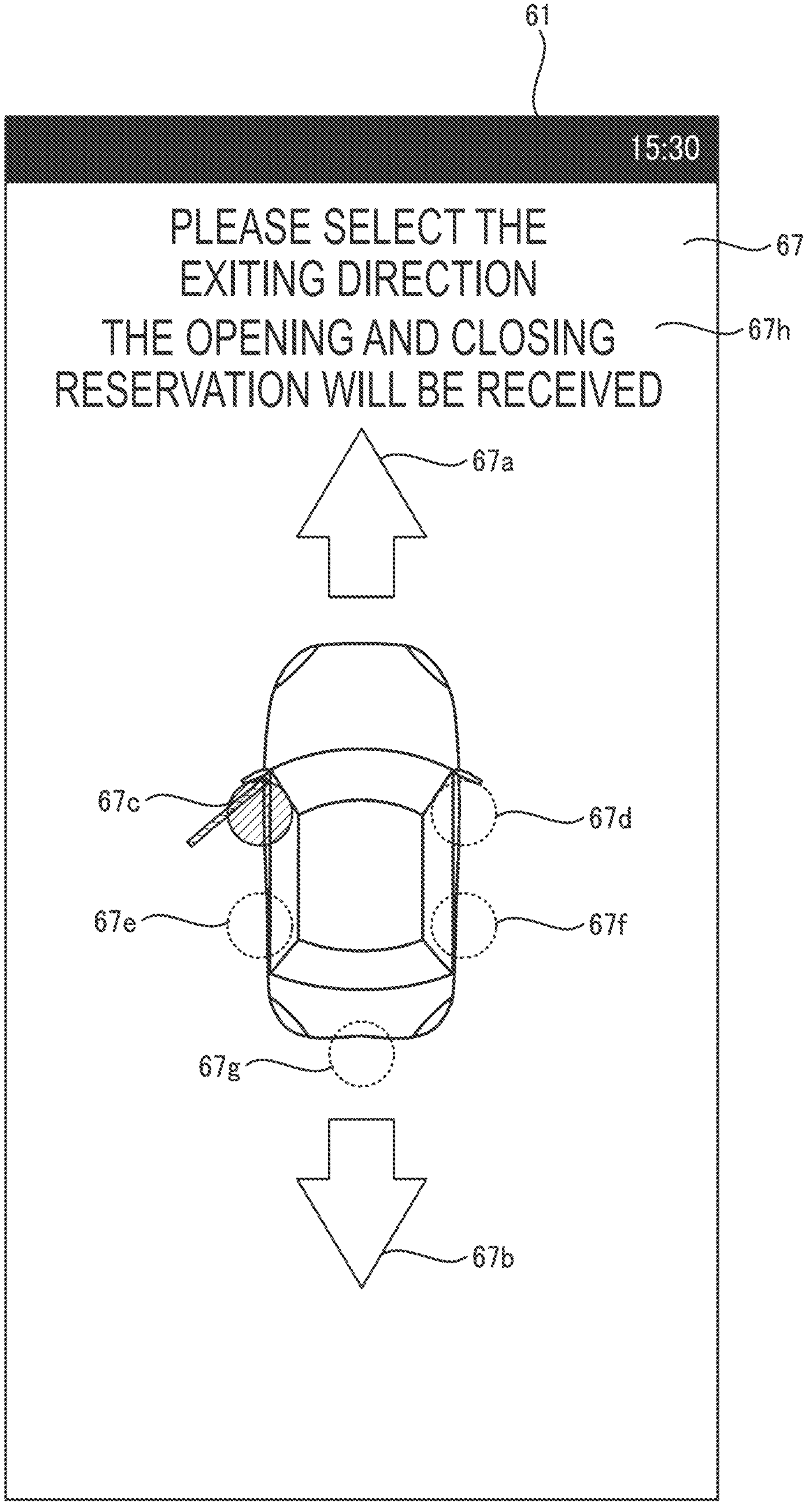
FIG. 12 shows an example of an exiting direction selection screen displayed on the information terminal during automated parking.

When the ignition ON button 66*b* is touched in step S17, the processor 81 displays, on the terminal screen 61, for example, an exiting direction selection screen 67 for receiving selection of the exiting direction of the automated exiting and the opening and closing reservation of the opening and closing body as shown in FIG. 12 (step S18). The processor 81 displays, on the exiting direction selection screen 67, for example, forward exiting 67*a* of moving forward to leave the parking space and then stopping, and backward exiting 67*b* of moving backward to leave the parking space and then stopping. The processor 81 displays, on the exiting direction selection screen 67, for example, a left front door 67*c* for performing opening and closing reservation for a left front door, a right front door 67*d* for performing opening and closing reservation for a right front door, a left rear door 67*e* for performing opening and closing reservation of a left rear door, a right rear door 67*f* for performing opening and closing reservation of a right rear door, and a tail gate 67*g* for performing opening and closing reservation of a tail gate. Further, the processor 81 displays, on the exiting direction selection screen 67, for example, a selection message 67*h* such as "please select the exiting direction" and "the opening and closing reservation will be received". On the exiting direction selection screen 67, the user M may touch and select the exiting direction (67*a*, 67*b*)

in which the user M intends to cause the vehicle 10 to exit and the opening and closing body (67c to 67g) to be opened and closed.

Figure 13:
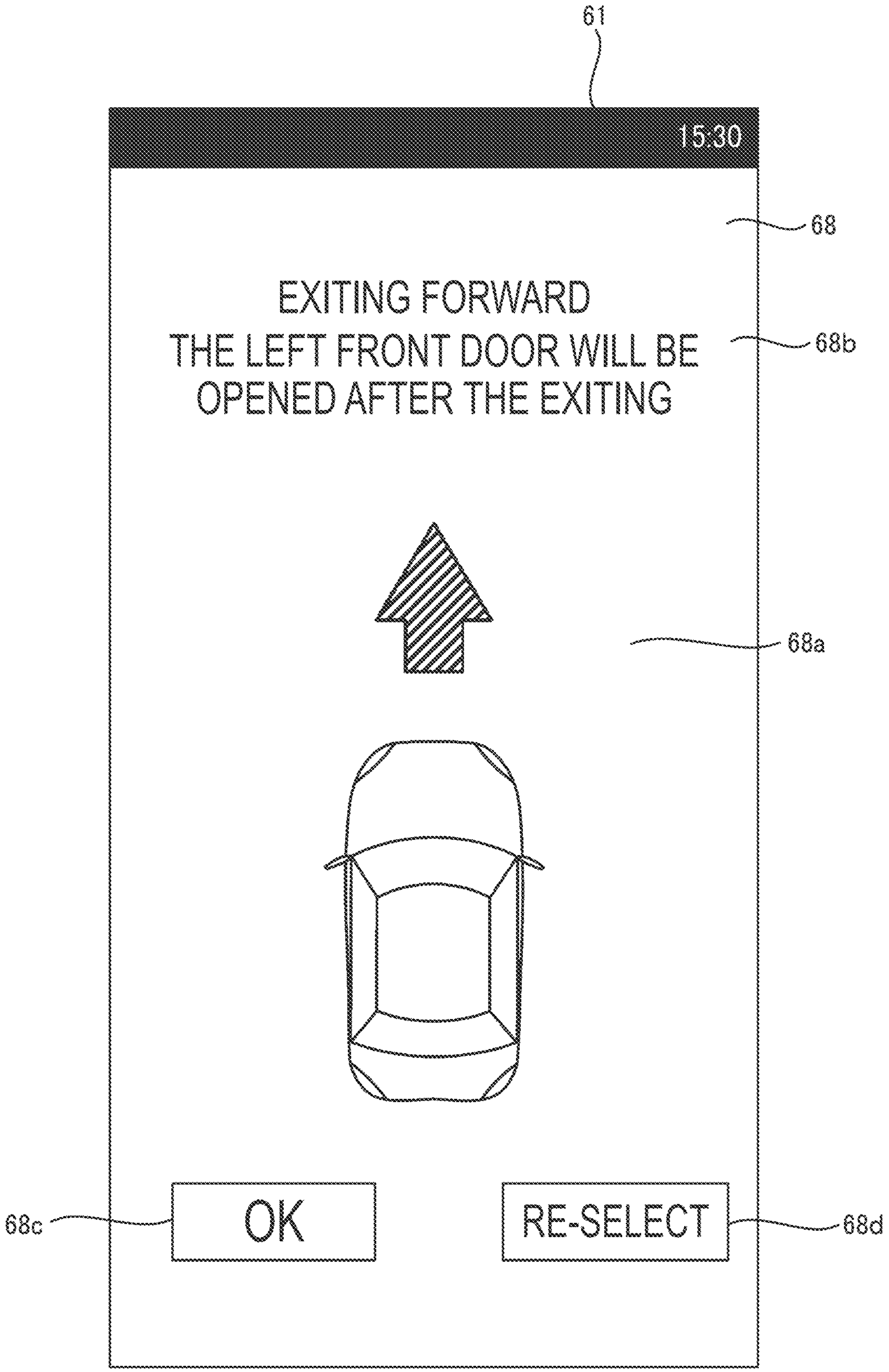
FIG. 13 shows an example of an exiting direction confirmation screen displayed on the information terminal during automated parking.

When any one of the exiting direction and the opening and closing body is selected on the exiting direction selection screen 67, the processor 81 displays, on the terminal screen 61, for example, an exiting direction confirmation screen 68 as shown in FIG. 13. The processor 81 displays, on the exiting direction confirmation screen 68, an exiting direction image 68a indicating the received exiting direction and the reserved opening and closing body. In the case of the example shown in the drawing, it is displayed that the forward exiting and the opening and closing reservation of the left front door are received. The processor 81 displays, on the exiting direction confirmation screen 68, for example, a confirmation message 68b such as "exiting forward" and "the left front door will be opened after the exiting". Further, the processor 81 displays, on the exiting direction confirmation screen 68, an OK button 68c for confirming the exiting direction and the reserved opening and closing body, and a re-selection button 68d for re-selecting the exiting direction and the reserved opening and closing body. When the re-selection button 68d is touched, the processor 81 displays the exiting direction selection screen 67 in FIG. 12 to select the exiting direction and the opening and closing body again.

Figure 14:
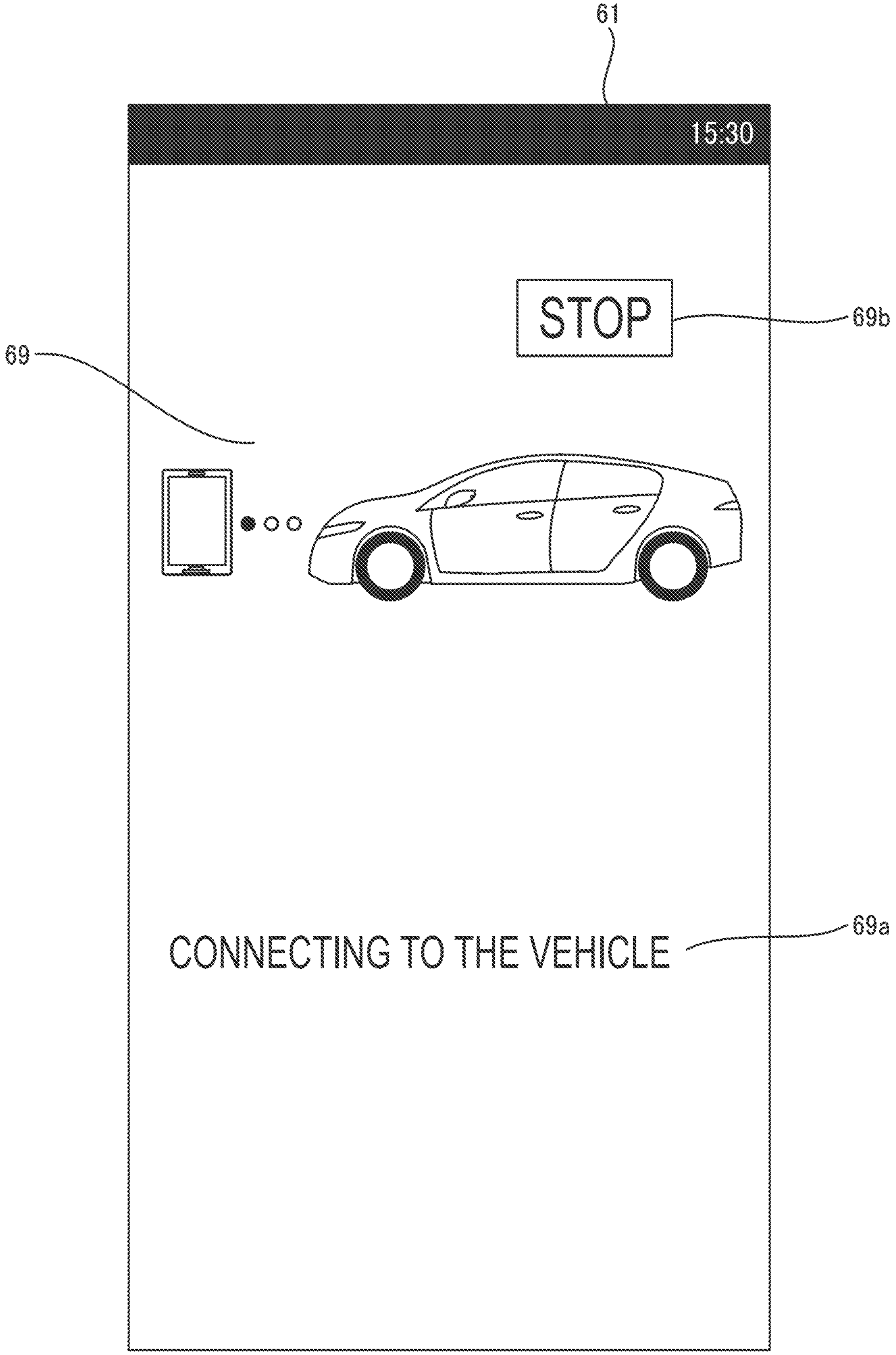
FIG. 14 shows an example of a vehicle connection screen displayed on the information terminal during automated parking.

In step S18, when the OK button 68c is touched on the exiting direction confirmation screen 68 in FIG. 13, the processor 81 starts processing of communication connection with the vehicle 10 and displays, on the terminal screen 61, for example, a connection screen 69 as shown in FIG. 14 (step S19). The processor 81 displays, on the connection screen 69, a connection message 69a indicating that connection processing with the vehicle 10 is being performed, such as "connecting to the vehicle", and a stop button 69b for stopping the connection processing. When the communication connection with the vehicle 10 is completed, the processor 81 transmits, to the vehicle 10, automated exiting information including the exiting direction and the reserved opening and closing body received at the time of exiting in step S18.

Figure 15:
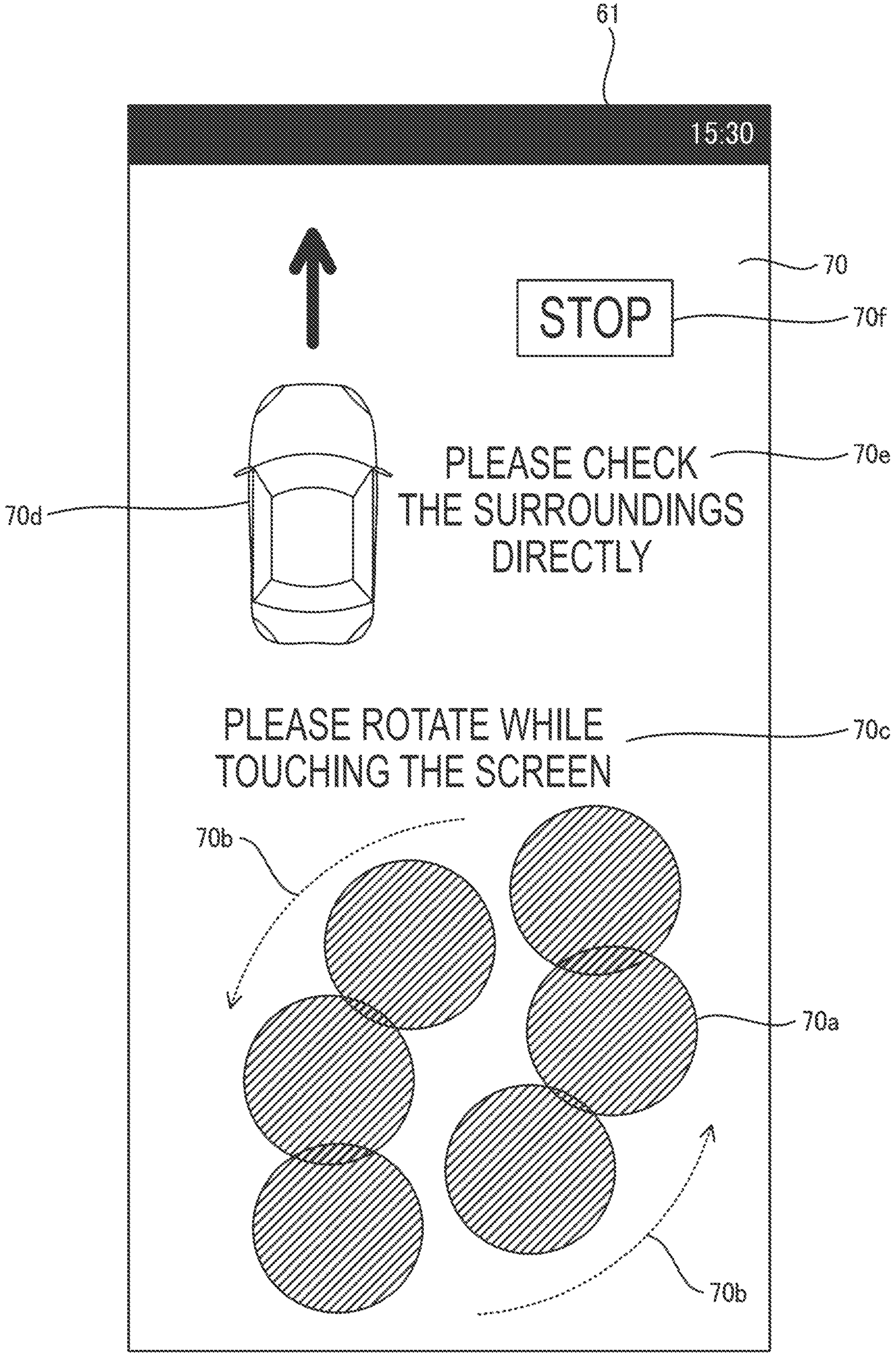
FIG. 15 shows an example of an operation input start screen displayed on the information terminal during automated exiting.

Next, for example, the processor 81 displays, on the terminal screen 61, an operation input start screen 70 for guiding the start of the automated exiting as shown in FIG. 15 (step S20). The processor 81 displays, on the operation input start screen 70, for example, an image in which six spheres 70a perform left rotation in a direction indicated by an arrow 70b. That is, an image for prompting a rotational swipe operation of sliding counterclockwise on the terminal screen 61 is displayed. The processor 81 also displays, on the operation input start screen 70, for example, a guidance message 70c such as "please rotate it while touching the screen". The processor 81 displays, on the operation input start screen 70, a vehicle image 70d indicating that the vehicle 10 exits forward and an attention calling message 70e such as "please check the surroundings directly". Further, the processor 81 displays a stop button 70f for stopping the automated exiting on the operation input start screen 70.

Next, the processor 81 determines whether the rotational swipe operation is started on the terminal screen 61 (step S21).

In step S21, when the rotational swipe operation is not started (step S21: No), the processor 81 repeats the processing of step S21 and stands by until the rotational swipe operation is started.

Figure 16:
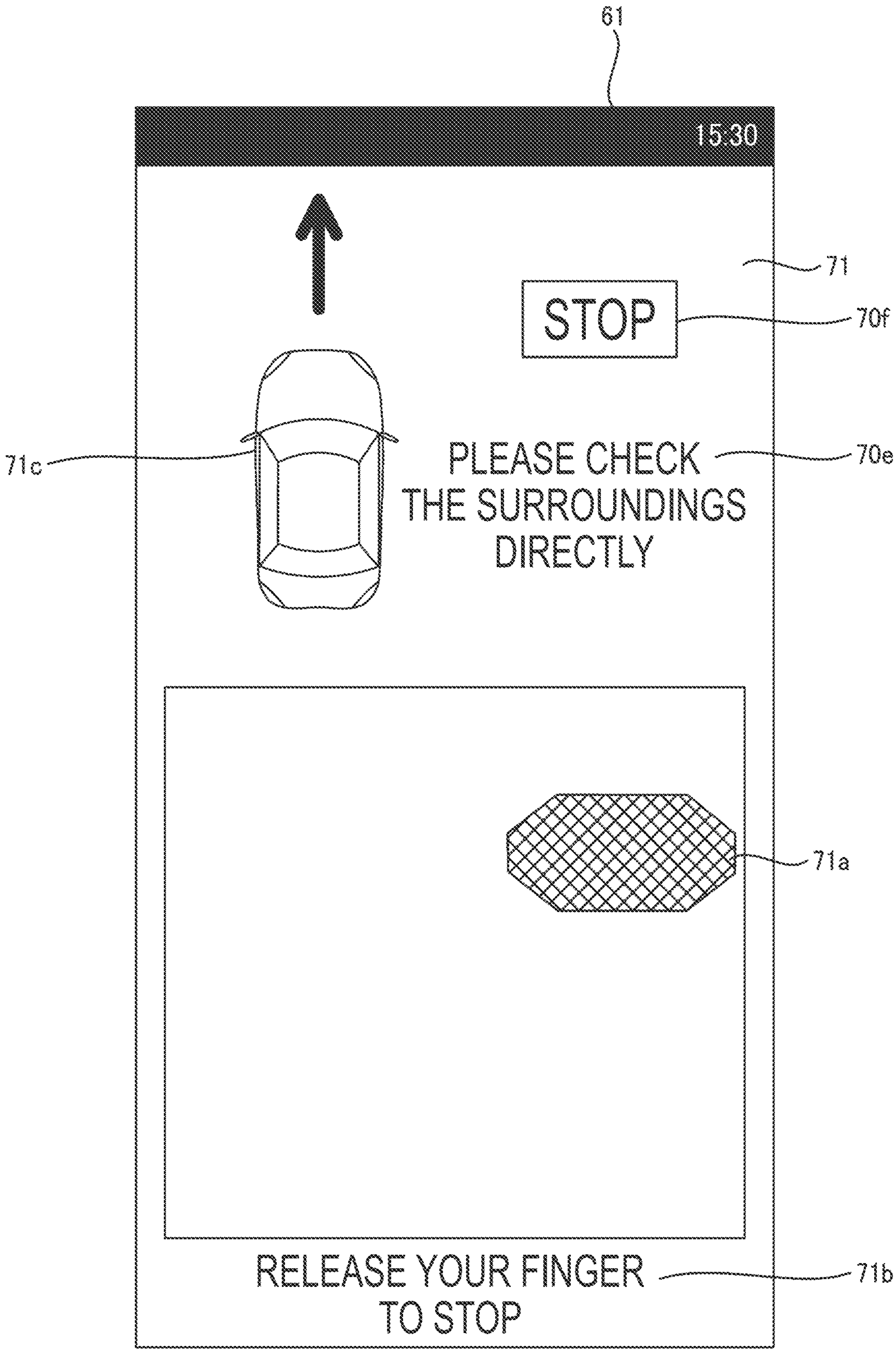
FIG. 16 shows an example of an operation input screen displayed on the information terminal during automated exiting.

In step S21, when the rotational swipe operation is started (step S21: Yes), for example, as shown in FIG. 16, the processor 81 displays, on the terminal screen 61, an operation input screen 71 indicating a state in which the rotational swipe operation is performed at the time of exiting (step S22). The processor 81 displays, on the operation input screen 71, for example, a movement icon 71a that moves following a touch position of the user M during the rotational swipe operation. The processor 81 also displays a guidance message 71b for stopping the automated exiting of the vehicle 10, such as "release your finger to stop". The processor 81 displays, on the operation input screen 71, a vehicle image 71c indicating that the vehicle 10 is exiting forward, and the attention calling message 70e and the stop button 70f as in FIG. 15. In this way, when the rotational swipe operation is performed on the terminal screen 61, the movement icon 71a rotationally moves following the touch position, and the vehicle 10 moves according to the rotational movement. When a finger performing the rotational swipe operation is released from the terminal screen 61 or when the rotational swipe operation is stopped, the movement of the automated exiting of the vehicle 10 is temporarily stopped.

Next, the processor 81 starts automated exiting of the vehicle 10 by transmitting the exiting instruction signal to the vehicle 10 (step S23). Upon receiving the exiting instruction signal from the information terminal 60, the automated parking control unit 55 of the vehicle 10 starts the automated exiting of the vehicle 10 based on the automated exiting information including the exiting direction and the reserved opening and closing body received at the time of exiting according to the received exiting instruction signal.

Next, the processor 81 determines whether the automated exiting is completed, that is, whether the exiting of the vehicle 10 in the exiting direction selected by the user M is completed (step S24). Whether the automated exiting is completed may be determined based on information about the execution control of the automated exiting transmitted from the automated parking control unit 55 of the vehicle 10.

In step S24, when the automated exiting is not completed (step S24: No), the processor 81 repeats the processing of step S24 and stands by until the automated exiting is completed.

Figure 17:
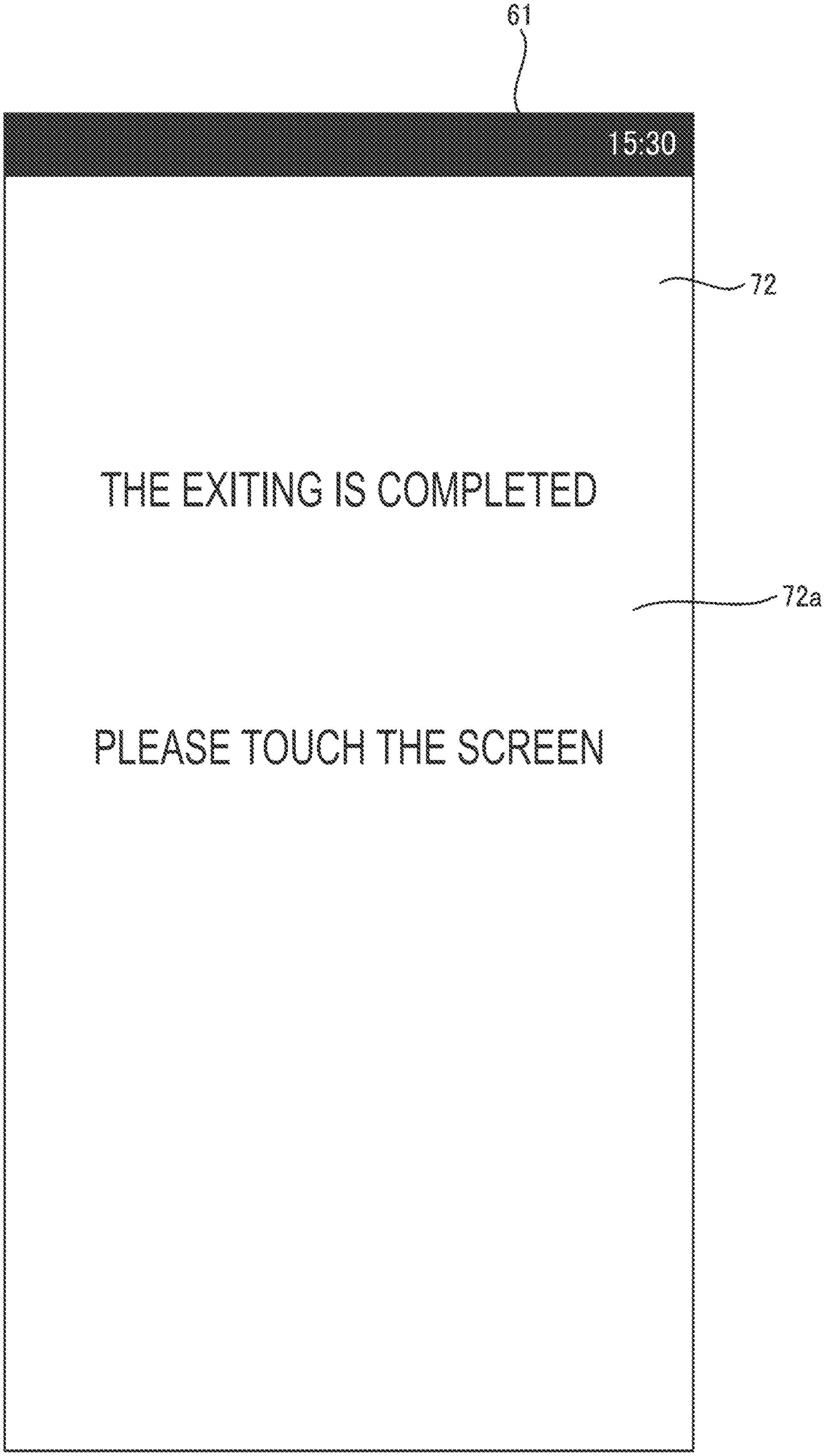
FIG. 17 shows an example of an automated exiting completion screen displayed on the information terminal during automated exiting.

In step S24, when the automated exiting is completed (step S24: Yes), the processor 81 displays, on the terminal screen 61, for example, an automated exiting completion screen 72 as shown in FIG. 17 (step S25). The processor 81 displays, on the automated exiting completion screen 72, for example, an exiting completion message 72a such as "exiting has been completed, please touch the screen". When the terminal screen 61 is touched on the automated exiting completion screen 72, the processor 81 ends the present exiting instruction control at the time of the automated exiting.

<Processing of Vehicle 10 During Automated Exiting>

Figure 18:
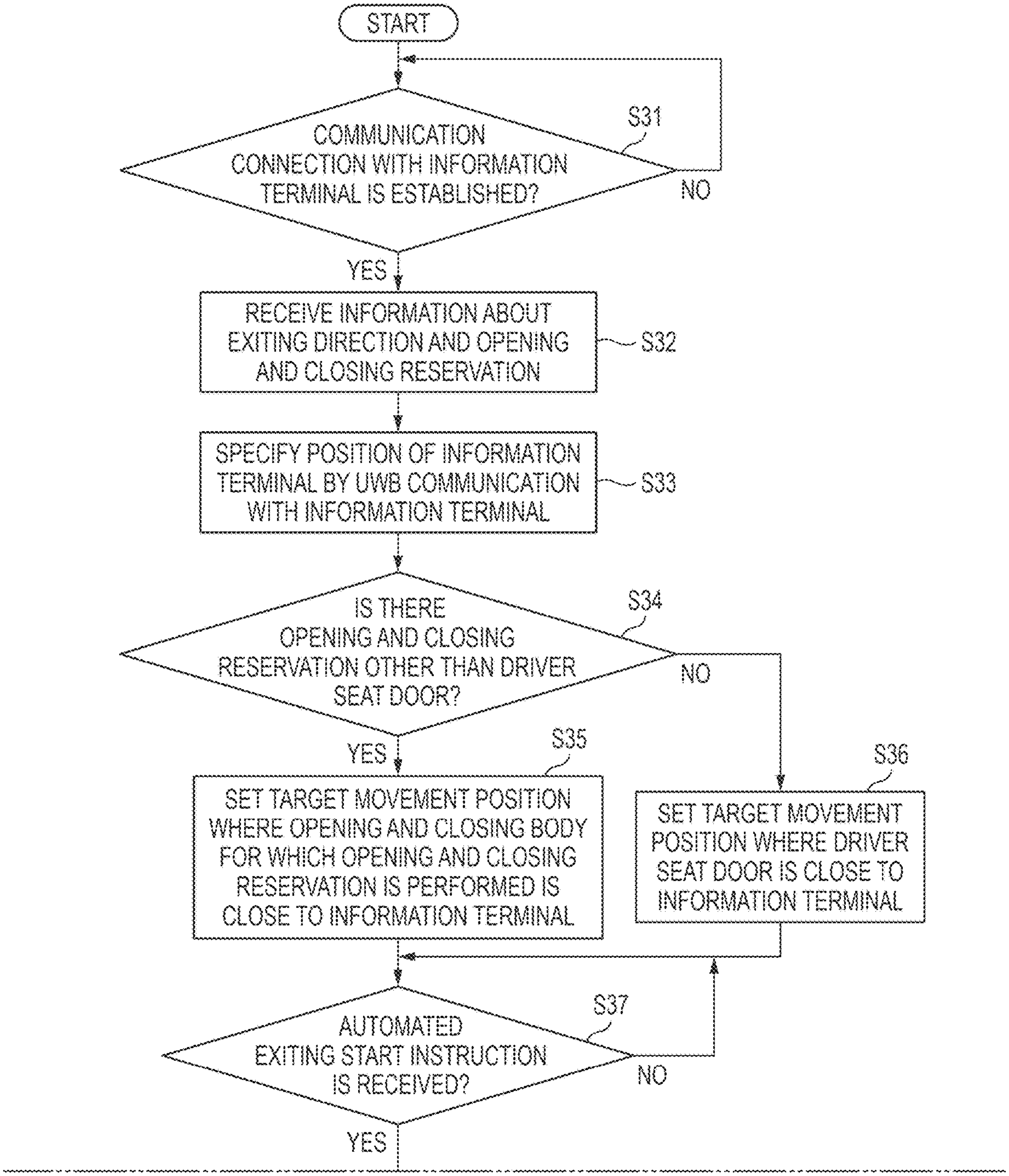
FIG. 18 is a flowchart showing exiting execution control of the vehicle during automated exiting.

Next, an example of the exiting execution control by the automated parking control unit 55 of the vehicle 10 during automated exiting will be described with reference to the flowchart in FIG. 18.

The automated parking control unit 55 of the vehicle 10 determines whether communication connection with the information terminal 60 is established, that is, whether the information terminal 60 approaches within a distance at which the wireless communication with the vehicle 10 is available (step S31).

In step S31, when the communication connection with the information terminal 60 is not established (step S31: No), the automated parking control unit 55 stands by until the communication connection is established.

In step S31, when the communication connection with the information terminal 60 is established (step S31: Yes), the automated parking control unit 55 receives, from the information terminal 60, the automated exiting information about the exiting direction and the reserved opening and closing body of the vehicle 10 received by the information terminal 60 (step S32).

Next, the automated parking control unit 55 specifies a relative position between the host vehicle 10 and the information terminal 60 by performing UWB communication with the information terminal 60 (step S33).

Next, the automated parking control unit 55 determines, based on the automated exiting information received from the information terminal 60 in step S32, whether the opening and closing reservation for a door other than a driver seat door is performed at the time of exiting of the vehicle 10 (step S34).

In step S34, when the opening and closing reservation for the door other than the driver seat door is performed (step S34: Yes), the automated parking control unit 55 sets the target movement position of the vehicle 10 such that the door (opening and closing body) for which the opening and closing reservation is performed when the vehicle 10 exits is close to the information terminal 60 (the user M carrying the information terminal 60) (step S35).

In step S34, when the opening and closing reservation for the door other than the driver seat door is not performed (step S34: No), the automated parking control unit 55 sets the target movement position of the vehicle 10 such that the driver seat door is close to the information terminal 60 when the vehicle 10 exits (step S36). Such a case includes a case where the opening and closing reservation for the driver seat door is performed and a case where none of the doors is reserved.

Next, the automated parking control unit 55 determines whether an automated exiting start instruction is received from the information terminal 60, that is, whether the exiting instruction signal transmitted from the information terminal 60 in the processing of step S23 in the information terminal 60 in FIG. 6 is received (step S37).

In step S37, when the automated exiting start instruction is not received from the information terminal 60 (step S37: No), the automated parking control unit 55 stands by until the automated exiting start instruction is received.

In step S37, when the automated exiting start instruction is received from the information terminal 60) (step S37: Yes), the automated parking control unit 55 starts movement of the vehicle 10 to the target movement position set in step S35 or step S36 (step S38).

Next, the automated parking control unit 55 determines whether the vehicle 10 reaches the target movement position (step S39).

In step S39, when the target movement position is not reached (step S39: No), the automated parking control unit 55 repeats the processing until the target movement position is reached. When the rotational swipe operation is stopped in the processing of step S21 and step S22 in FIG. 6 in the information terminal 60 before reaching the target movement position, an exiting stop signal is transmitted from the information terminal 60 to the vehicle 10. In this case, the automated parking control unit 55 stops the automated exiting of the vehicle 10. When the rotational swipe operation is stopped in the processing of step S21 and step S22 in FIG. 6 in the information terminal 60, the exiting instruction signal transmitted from the information terminal 60 to the vehicle 10 may be stopped in the processing of step S23. When the exiting instruction signal is stopped, the automated parking control unit 55 may stop the automated exiting of the vehicle 10.

In step S39, when the target movement position is reached (step S39: Yes), the automated parking control unit 55 determines whether the opening and closing reservation is performed for the door of the vehicle 10 based on the automated exiting information received from the information terminal 60 in step S32 (step S40).

In step S40, when the opening and closing reservation for the door is performed (step S40: Yes), the automated parking control unit 55 performs opening and closing of the door for which the opening and closing reservation is performed by the opening and closing control by the opening and closing control unit 56 (step S41), and ends the present exiting execution control. As described above, the opening and closing of the door include processing of unlocking the door and processing of automatically opening and closing the door.

In step S40, in a case where the opening and closing reservation for the door is not performed (step S40): No), the automated parking control unit 55 does not perform the opening and closing of the door, and ends the present exiting execution control.

<Example of Movement to Target Movement Position>

Figure 19:
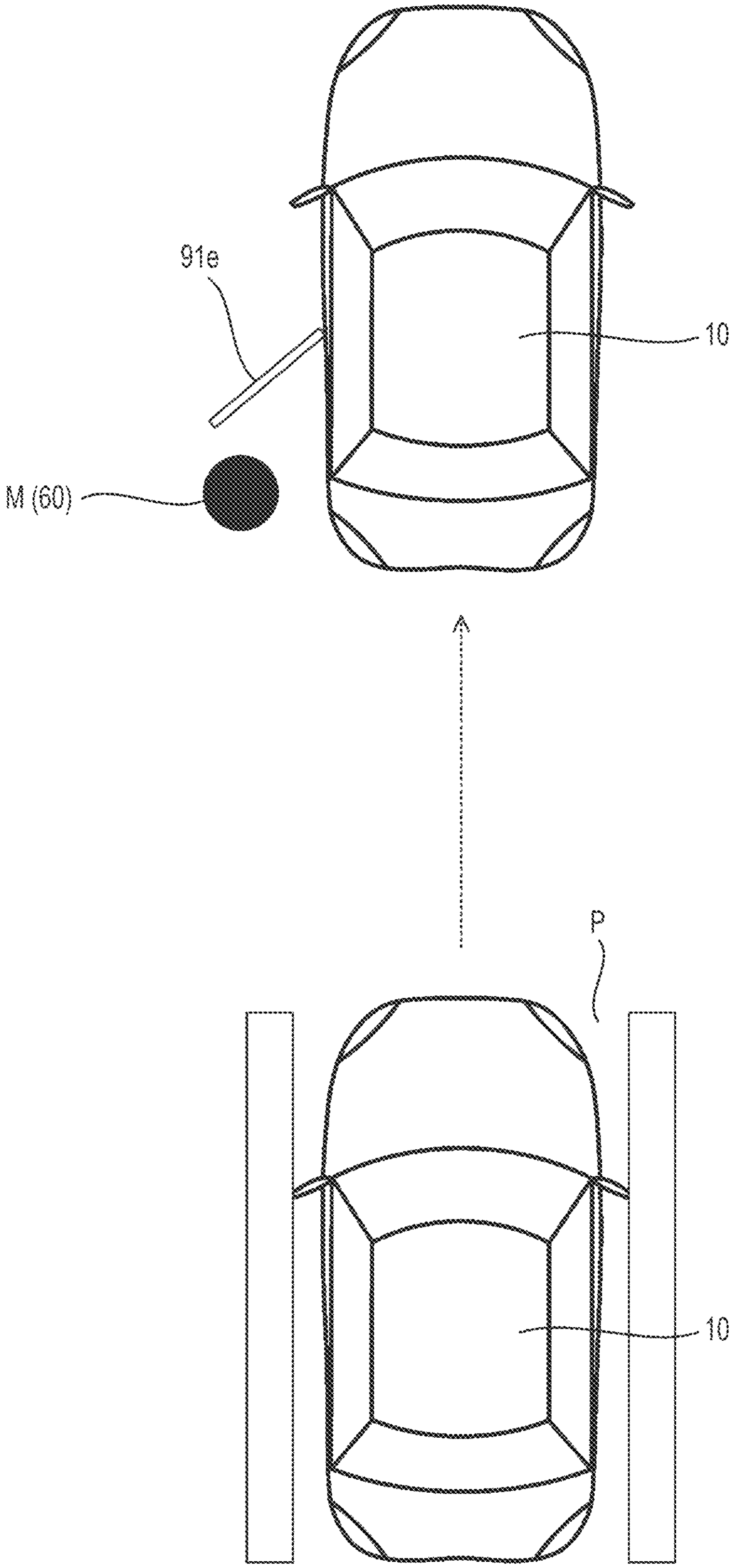
FIG. 19 shows an automated exiting stop position of the vehicle when an opening and closing reservation of a left rear door is performed.

Next, an example of movement of the vehicle 10 moving to the target movement position by the exiting execution control will be described with reference to FIGS. 19 and 20. FIG. 19 shows a state in which the vehicle 10 performs automated exiting to the target movement position when the opening and closing reservation for a left rear door of the vehicle 10 is performed. In this case, a position where the user M easily accesses the left rear door is set as the target movement position of the exiting execution control.

As shown in FIG. 19, the vehicle 10 is controlled, with respect to the user M carrying the information terminal 60, to move from the parking space P to a position where the user M easily accesses a left rear door 91*e* and stop. After the vehicle 10 moves to the target movement position, the left rear door 91*e* for which the opening and closing reservation is performed is opened and closed. The shown vehicle 10 shows a state in which the left rear door 91*e* is opened.

In a case where the external environment recognition unit 57 recognizes that there is a surrounding object that becomes an obstacle in the vicinity of the left rear door 91*e* when opening and closing the left rear door 91*e* of the vehicle 10, the automated parking control unit 55 sets the target movement position such that the surrounding object does not obstruct opening and closing of the left rear door 91*e*. The automated parking control unit 55 performs the exiting execution control such that the vehicle 10 stops at the target movement position. The automated parking control unit 55 sets the target movement position based on a distance between the door of the vehicle 10 and the surrounding object, a type of the door (a tail gate, a slide door, a hinge door, and the like), and the like.

Figure 20:
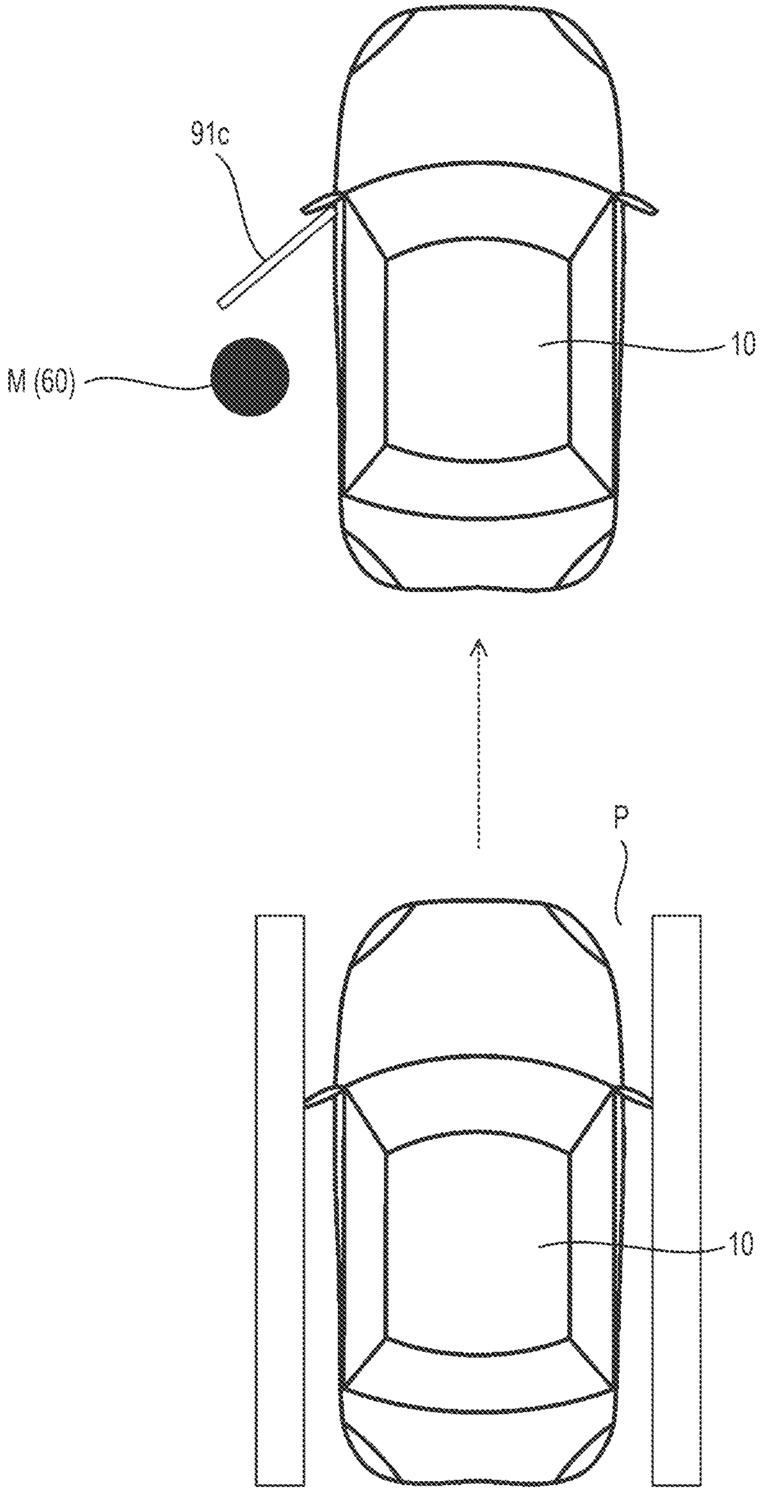
FIG. 20 shows the automated exiting stop position of the vehicle when the opening and closing reservation of a left front door is performed.

FIG. 20 shows a state in which the vehicle 10 performs automated exiting to the target movement position when the opening and closing reservation for the left front door of the vehicle 10 is performed. In this case, a position where the user M easily accesses the left front door is set as the target movement position of the exiting execution control. The left front door is the driver seat door of the vehicle 10.

As shown in FIG. 20, the vehicle 10 is controlled, with respect to the user M carrying the information terminal 60, to move from the parking space P to a position where the user M easily accesses a left front door 91*c* and stop. After the vehicle 10 moves to the target movement position, the left front door 91*c* for which the opening and closing reservation is performed is opened and closed.

When the opening and closing reservation of the opening and closing body is not performed, as described above, the position at which the user M easily accesses the driver seat door (left front door 91*c*) of the vehicle 10 is set as the target movement position. In this case, the vehicle 10 is still controlled, with respect to the user M carrying the information terminal 60, to move to a position where the user M easily accesses the left front door 91*c* and stop as shown in FIG. 20. However, since the opening and closing reservation of the opening and closing body is not performed, automatic opening and closing of the driver seat door (left front door 91*c*) is not performed.

As described above, in a case where the opening and closing reservation of the specific opening and closing body other than the opening and closing body of the driver seat among the opening and closing bodies of the vehicle 10 is received when the vehicle 10 is subjected to the exiting execution control, the automated parking control unit 55 of the calculation unit 52 of the vehicle 10 sets the target movement position of the exiting execution control based on the positional relationship between the specific opening and closing body for which the opening and closing reservation is performed and the information terminal 60.

Accordingly, in a case where the opening and closing reservation of the specific opening and closing body is received, even when the user M of the vehicle 10 does not manually set the target movement position of the exiting execution control, the position at which the user M easily accesses the specific opening and closing body is set as the target movement position of the exiting execution control. Therefore, it is possible to reduce a burden on the user M at the time of automated exiting of the vehicle 10, and thus usability is improved.

In a case where the opening and closing reservation of the specific opening and closing body is not received when the vehicle 10 is subjected to the exiting execution control, the automated parking control unit 55 sets the target movement position of the exiting execution control based on the positional relationship between the opening and closing body of the driver seat and the information terminal 60. Accordingly, in a case where the opening and closing reservation of the specific opening and closing body is not received, even when the user M does not manually set the target movement position of the exiting execution control, the position where the user M easily accesses the driver seat is set as the target movement position of the exiting execution control. Therefore, it is possible to reduce a burden on the user M at the time of automated exiting of the vehicle 10.

The automated parking control unit 55 determines the state of the user M of the vehicle 10 and automatically receives the opening and closing reservation of the specific opening and closing body based on the determination result. Accordingly, it is possible to further reduce the burden on the user M at the time of automated exiting of the vehicle 10.

Based on the recognition result of the external environment of the vehicle 10 by the external environment recognition unit 57, the automated parking control unit 55 determines the availability of opening and closing of the opening and closing body for which the opening and closing reservation is performed and sets the target movement position of the exiting execution control based on the determination result. Accordingly, it is possible to prevent a situation in which, for example, the opening and closing body cannot be opened and closed due to a surrounding object in a state in which the vehicle 10 arrives at the target movement position.

The automated parking control unit 55 determines the availability of opening and closing of the opening and closing body according to the distance between the opening and closing body and the surrounding object and the type of the opening and closing body. Accordingly, it is possible to prevent a situation in which the opening and closing body cannot be opened and closed even though the vehicle 10 arrives at the target movement position.

When the vehicle 10 arrives at the target movement position, the automated parking control unit 55 performs the opening and closing of the opening and closing body for which the opening and closing reservation is performed. Accordingly, since the opening and closing of the opening and closing body are automatically performed, the burden on the user M may be further reduced.

The automated parking control unit 55 specifies the position of the information terminal 60 with respect to the vehicle 10 based on the ultra wide band communication with the information terminal 60. Accordingly, it is possible to specify the position of the information terminal 60 with high accuracy, and it is possible to set an optimum target movement position of the vehicle 10 at which the user M easily accesses the opening and closing body.

Although the embodiment of the present invention has been described above, the present invention is not limited to the above-described embodiment, and modifications, improvements, and the like may be appropriately made.

For example, in the above-described embodiment, a case is described in which the calculation unit 52 that is an example of the control device causes the automated parking control unit 55 to set the target movement position of the movement control based on the positional relationship between the specific opening and closing body for which the opening and closing reservation is performed and the information terminal, but the present invention is not limited thereto. For example, the information terminal 60 may be employed as an example of the control device, and the processor 81 of the information terminal 60 may set the target movement position of the movement control based on the positional relationship between the specific opening and closing body for which the opening and closing reservation is performed and the information terminal.

In the above-described embodiment, an example in which the moving object is a vehicle (four-wheeled automobile) has been described, but the moving object is not limited thereto. For example, the moving object may be a vehicle such as a motorcycle or a Segway. Further, the idea of the present invention is not limited to the vehicle, and may also be applied to a robot, a ship, an aircraft, or the like that includes a drive source and is movable by power of the drive source.

The control method described in the above embodiment may be implemented by executing a control program prepared in advance on a computer. The control program is stored in a computer-readable storage medium and executed by being read from the storage medium. In addition, the control program may be provided in a form stored in a non-transitory storage medium such as a flash memory; or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

In the present specification, at least the following matters are described. Although corresponding constituent elements or the like in the embodiment described above are shown in parentheses, the present invention is not limited thereto.

(1) A control device (calculation unit 52) for a moving object (vehicle 10) that includes a plurality of opening and closing bodies, the control device including:

a control unit (automated parking control unit 55) configured to perform movement control of the moving object based on a specific operation on an information terminal (information terminal 60) portable by a user (user M) of the moving object, in which when an opening and closing reservation of a specific opening and closing body other than an opening and closing body of a driver seat of the moving object among the plurality of opening and closing bodies is received during execution of the movement control, the control unit sets a target movement position of the movement control based on a positional relationship between the specific opening and closing body and the information terminal.

According to (1), in a case where the opening and closing reservation of the specific opening and closing body is received, even when the user does not manually set the target movement position of the movement control, the position at which the user easily accesses the specific opening and closing body is set as the target movement position of the movement control, thus a burden on the user is reduced and usability is improved.

(2) The control device according to (1), in which when the opening and closing reservation of the specific opening and closing body is not received during the execution of the movement control, the control unit sets the target movement position of the movement control based on a positional relationship between the opening and closing body of the driver seat and the information terminal.

According to (2), in a case where the opening and closing reservation of the specific opening and closing body is not received, even when the user does not manually set the target movement position of the movement control, the position at which the user easily accesses the driver seat is set as the target movement position of the movement control, thus the burden on the user is reduced and usability is improved.

(3) The control device according to (1) or (2), in which the control unit automatically receives the opening and closing reservation of the specific opening and closing body based on a determination result of a state of the user of the moving object.

According to (3), the burden on the user may be further reduced, and usability is improved.

(4) The control device according to any one of (1) to (3), further including:

an external environment recognition unit configured to recognize an external environment of the moving object, in which the control unit determines availability of opening and closing of the opening and closing body based on a recognition result by the external environment recognition unit, and sets the target movement position of the movement control based on a determination result of the availability of opening and closing of the opening and closing body.

According to (4), it is possible to prevent a situation in which the opening and closing body cannot be opened and closed in a state in which the moving object arrives at the target movement position.

(5) The control device according to (4), in which the control unit determines the availability of opening and closing of the opening and closing body according to a distance between the opening and closing body and a surrounding object and a type of the opening and closing body.

According to (5), it is possible to prevent a situation in which the opening and closing body cannot be opened and closed even though the moving object arrives at the target movement position.

(6) The control device according to any one of (1) to (5), in which the control unit performs opening and closing of the opening and closing body when the moving object arrives at the target movement position.

According to (6), the burden on the user is reduced and usability is improved.

(7) The control device according to any one of (1) to (6), in which the control unit specifies a position of the information terminal based on ultra wide band communication with the information terminal.

According to (7), the position of the information terminal may be specified with high accuracy, and an optimum target movement position may be set.

(8) A control method for a moving object that includes a plurality of opening and closing bodies, the control method including:

causing a control unit configured to perform movement control of the moving object based on a specific operation on an information terminal portable by a user of the moving object to set, when an opening and closing reservation of a specific opening and closing body other than an opening and closing body of a driver seat of the moving object among the plurality of opening and closing bodies is received during execution of the movement control, a target movement position of the movement control based on a positional relationship between the specific opening and closing body and the information terminal.

According to (8), in a case where the opening and closing reservation of the specific opening and closing body is received, even when the user does not manually set the target movement position of the movement control, the position at which the user easily accesses the specific opening and closing body is set as the target movement position of the movement control, thus a burden on the user is reduced and usability is improved.

(9) A control program for a moving object that includes a plurality of opening and closing bodies, in which the control program causes a processor configured to perform movement control of the moving object based on a specific operation on an information terminal portable by a user of the moving object to execute processing of setting, when an opening and closing reservation of a specific opening and closing body other than an opening and closing body of a driver seat of the moving object among the plurality of opening and closing bodies is received during execution of the movement control, a target movement position of the movement control based on a positional relationship between the specific opening and closing body and the information terminal.

According to (9), in a case where the opening and closing reservation of the specific opening and closing body is received, even when the user does not manually set the target movement position of the movement control, the position at which the user easily accesses the specific opening and closing body is set as the target movement position of the movement control, thus a burden on the user is reduced and usability is improved.

REFERENCE SIGNS LIST

10 vehicle (moving object)
52 calculation unit (control device)
55 automated parking control unit (control unit)
57 external environment recognition unit
60 information terminal
91*c* left front door (opening and closing body)
91*e* left rear door (opening and closing body)

The invention claimed is:

1. A control device for a moving object that includes a plurality of opening and closing bodies, the control device comprising a processor configured to:

acquire a position of a user of the moving object; and perform movement control of the moving object based on a specific operation on an information terminal portable by the user, wherein, in response to an opening and closing reservation of the opening and closing body being received during execution of the movement control, the processor sets a target movement position of the movement control based on a positional relationship between the opening and closing body for which the opening and closing reservation is set and the user, and in response to the opening and closing reservation of the opening and closing body not being received during execution of the movement control, the processor sets the target movement position of the movement control based on the positional relationship between a specific opening and closing body and the user.

2. The control device according to claim 1, wherein, the specific opening and closing body is an opening and closing body of a driver seat of the moving object, and when the opening and closing reservation of the opening and closing body is not received during execution of the movement control, the processor sets the target movement position of the movement control based on a positional relationship between an opening and closing body of a driver seat and the user.

3. The control device according to claim 1, wherein the processor automatically receives the opening and closing reservation of the opening and closing body based on a determination result of a state of the user of the moving object.

4. The control device according to claim 1, wherein the processor is configured to recognize an external environment of the moving object, determine availability of opening and closing of the opening and closing body based on a recognition result of the external environment, and set the target movement position of the movement control based on a determination result of the availability of opening and closing of the opening and closing body.

5. The control device according to claim 4, wherein the processor is configured to determine the availability of opening and closing of the opening and closing body according to a distance between the opening and closing body and a surrounding object and a type of the opening and closing body.

6. The control device according to claim 1, wherein the processor is configured to perform opening and closing of the opening and closing body when the moving object arrives at the target movement position.

7. The control device according to claim 1, wherein the processor is configured to specify a position of the user based on ultra wide band communication with the information terminal.

8. The control device according to claim 1, wherein, the specific opening and closing body is set by the user, and in response to the opening and closing reservation of the opening and closing body not being received during execution of the movement control, the processor sets the target movement position of the movement control based on the positional relationship between the opening and closing body set by the user and the user.

9. A control method for a moving object that includes an opening and closing body, the control method comprising:

acquiring a position of a user of the moving object; and causing a processor configured to perform movement control of the moving object based on a specific operation on an information terminal portable by the user to set, in response to an opening and closing reservation of the opening and closing body being received during execution of the movement control, a target movement position of the movement control based on a positional relationship between the opening and closing body for which the opening and closing reservation is set and the user, and set, in response to the opening and closing reservation of the opening and closing body not being received during execution of the movement control, the target movement position of the movement control based on the positional relationship between a specific opening and closing body and the user.

10. A non-transitory computer-readable storage medium storing a control program for a moving object that includes an opening and closing body, wherein the control program causes a processor configured to acquire a position of a user of the moving object, and perform movement control of the moving object based on a specific operation on an information terminal portable by the user to execute processing of setting, in response to an opening and closing reservation of the opening and closing body being received during execution of the movement control, a target movement position of the movement control based on a positional relationship between the opening and closing body for which the opening and closing reservation is set and the user, and setting, in response to the opening and closing reservation of the opening and closing body not being received during execution of the movement control, the target movement position of the movement control based on the positional relationship between a specific opening and closing body and the user.

* * * * *